US012653180B2

(12) United States Patent　　(10) Patent No.:　US 12,653,180 B2
Bornhoft et al.　　　　　　　　(45) Date of Patent:　Jun. 16, 2026

(54) HYPOTHERMIC TISSUE STORAGE

(71) Applicant: Paragonix Technologies, Inc.,
Waltham, MA (US)

(72) Inventors: Steve Bornhoft, Waltham, MA (US);
Barry Gellman, Waltham, MA (US);
William Lucas Churchill, Waltham,
MA (US)

(73) Assignee: Paragonix Technologies, Inc.,
Waltham, MA (US)

( * ) Notice: Subject to any disclaimer, the term of this
patent is extended or adjusted under 35
U.S.C. 154(b) by 0 days.

(21) Appl. No.: 19/074,181

(22) Filed: Mar. 7, 2025

(65) Prior Publication Data

US 2025/0204519 A1　　Jun. 26, 2025

Related U.S. Application Data

(63) Continuation of application No.
PCT/US2023/032217, filed on Sep. 7, 2023.

(60) Provisional application No. 63/404,767, filed on Sep.
8, 2022.

(51) Int. Cl.
*A01N 1/146*　　　(2025.01)

(52) U.S. Cl.
CPC ..................................... *A01N 1/146* (2025.01)

(58) Field of Classification Search
CPC ........................ A01N 1/146; F25D 2303/0832
See application file for complete search history.

(56) References Cited

U.S. PATENT DOCUMENTS

| 3,323,872 | A | 6/1967 | Scott |
|---|---|---|---|
| 3,398,743 | A | 8/1968 | Shalit |
| 3,607,646 | A | 9/1971 | de Roissart |
| 3,935,065 | A | 1/1976 | Doerig |
| 4,336,248 | A | 6/1982 | Bonhard et al. |
| 4,502,295 | A | 3/1985 | Toldeo-Pereyra |
| 4,575,498 | A | 3/1986 | Holmes et al. |
| 4,643,713 | A | 2/1987 | Viitala |
| 4,723,974 | A | 2/1988 | Ammerman |
| 4,931,333 | A | 6/1990 | Henry |
| 4,952,409 | A | 8/1990 | Bando et al. |
| 4,976,708 | A | 12/1990 | Oshiyama |
| 5,066,578 | A | 11/1991 | Wikman-Coffelt |
| 5,093,969 | A | 3/1992 | McGuire |

(Continued)

FOREIGN PATENT DOCUMENTS

| CA | 2980782 | 11/2007 |
|---|---|---|
| CA | 2722615 | 10/2009 |

(Continued)

OTHER PUBLICATIONS

Chi et al., "The Development of a portable ECG monitor based on
DSP", Physics Procedia, vol. 33:765-774 (2012).

(Continued)

*Primary Examiner* — Jonathan M Hurst

(74) *Attorney, Agent, or Firm* — Knobbe Martens Olson
and Bear, LLP

(57)　　　ABSTRACT

Disclosed herein are devices, systems and methods for the
hypothermic storage of biological samples, such as tissues,
organs, or body fluids between arrival at a transplantation
site and transplantation. In some examples, various cooling
media may be positioned in and around a container used to
for the hypothermic storage.

20 Claims, 21 Drawing Sheets

(56)                References Cited

U.S. PATENT DOCUMENTS

| 5,133,470 A | 7/1992 | Abrams et al. |
| 5,141,847 A | 8/1992 | Sugimachi et al. |
| 5,149,321 A | 9/1992 | Klatz et al. |
| 5,157,930 A | 10/1992 | McGhee et al. |
| 5,186,431 A | 2/1993 | Tamari |
| 5,234,405 A | 8/1993 | Klatz et al. |
| RE34,387 E | 9/1993 | Holmes et al. |
| 5,252,537 A | 10/1993 | De Winter-Scailteur |
| 5,285,657 A | 2/1994 | Bacchi et al. |
| 5,306,711 A | 4/1994 | Andrews |
| D347,894 S | 6/1994 | Hansen et al. |
| 5,320,846 A | 6/1994 | Bistrian et al. |
| 5,326,706 A | 7/1994 | Yland et al. |
| 5,356,771 A | 10/1994 | O'Dell |
| 5,362,622 A | 11/1994 | O'Dell et al. |
| 5,385,821 A | 1/1995 | O'Dell et al. |
| 5,395,314 A | 3/1995 | Klatz et al. |
| 5,434,045 A | 7/1995 | Jost |
| 5,435,142 A | 7/1995 | Silber |
| 5,570,588 A * | 11/1996 | Lowe ................. B65D 81/3818 |
| | | 62/530 |
| 5,584,804 A | 12/1996 | Klatz et al. |
| 5,586,438 A | 12/1996 | Fahy |
| 5,599,659 A | 2/1997 | Brasile et al. |
| 5,601,972 A | 2/1997 | Meryman |
| 5,629,145 A | 5/1997 | Meryman |
| 5,643,712 A | 7/1997 | Brasile |
| 5,656,154 A | 8/1997 | Meryman |
| 5,696,152 A | 12/1997 | Southard |
| 5,699,793 A | 12/1997 | Brasile |
| 5,702,881 A | 12/1997 | Brasile et al. |
| 5,707,971 A | 1/1998 | Fahy |
| 5,709,654 A | 1/1998 | Klatz et al. |
| 5,712,084 A | 1/1998 | Osgood |
| 5,716,378 A | 2/1998 | Minten |
| 5,752,929 A | 5/1998 | Klatz et al. |
| 5,827,222 A | 10/1998 | Klatz et al. |
| 5,843,024 A | 12/1998 | Brasile |
| 5,916,800 A | 6/1999 | Elizondo et al. |
| 5,922,598 A | 7/1999 | Mintchev |
| 5,963,335 A | 10/1999 | Boutelle |
| 5,965,433 A | 10/1999 | Gardetto et al. |
| 6,014,864 A | 1/2000 | Owen |
| 6,020,575 A | 2/2000 | Nagle et al. |
| 6,024,698 A | 2/2000 | Brasile |
| 6,046,046 A | 4/2000 | Hassanein |
| 6,060,232 A | 5/2000 | Von Baeyer et al. |
| 6,100,082 A | 8/2000 | Hassanein |
| 6,174,719 B1 | 1/2001 | Elizondo et al. |
| 6,194,137 B1 | 2/2001 | Khirabadi et al. |
| 6,209,343 B1 | 4/2001 | Owen |
| 6,241,945 B1 | 6/2001 | Owen |
| 6,260,360 B1 | 7/2001 | Wheeler |
| 6,280,925 B1 | 8/2001 | Brockbank |
| 6,303,388 B1 | 10/2001 | Fahy |
| D453,828 S | 2/2002 | Brassil et al. |
| 6,375,613 B1 | 4/2002 | Brasile |
| 6,381,981 B1 | 5/2002 | Yaddgo et al. |
| 6,406,839 B1 | 6/2002 | Segall et al. |
| 6,413,713 B1 | 7/2002 | Serebrennikov |
| 6,475,716 B1 | 11/2002 | Seki |
| 6,485,450 B1 | 11/2002 | Owen |
| 6,492,103 B1 | 12/2002 | Taylor |
| D468,436 S | 1/2003 | Brassil et al. |
| D470,594 S | 2/2003 | Brassil et al. |
| 6,569,615 B1 | 5/2003 | Thatte et al. |
| 6,582,953 B2 | 6/2003 | Brasile |
| 6,596,531 B2 | 7/2003 | Campbell et al. |
| 6,642,019 B1 | 11/2003 | Anderson et al. |
| 6,642,045 B1 | 11/2003 | Brasile |
| 6,656,380 B2 | 12/2003 | Wood et al. |
| 6,673,008 B1 | 1/2004 | Thompson et al. |
| 6,673,594 B1 | 1/2004 | Owen et al. |
| 6,677,150 B2 | 1/2004 | Alford et al. |
| 6,699,231 B1 | 3/2004 | Sterman et al. |
| 6,736,836 B2 | 5/2004 | Montgomery |
| 6,740,484 B1 | 5/2004 | Khirabadi et al. |
| 6,773,877 B2 | 8/2004 | Fahy |
| 6,794,124 B2 | 9/2004 | Steen |
| 6,794,182 B2 | 9/2004 | Wolf, Jr. |
| 6,905,871 B1 | 6/2005 | Doorschodt et al. |
| 6,924,267 B2 | 8/2005 | Daemen et al. |
| 6,948,334 B1 * | 9/2005 | Challenger ............... F25D 3/08 |
| | | 220/592.2 |
| 6,953,655 B1 | 10/2005 | Hassanein et al. |
| 6,977,140 B1 | 12/2005 | Owen et al. |
| 6,994,954 B2 | 2/2006 | Taylor |
| 6,997,688 B1 | 2/2006 | Klein et al. |
| 7,005,253 B2 | 2/2006 | Polyak et al. |
| 7,008,535 B1 | 3/2006 | Spears et al. |
| 7,029,839 B2 | 4/2006 | Toledo-Pereyra et al. |
| D527,225 S | 8/2006 | Krieger et al. |
| D531,319 S | 10/2006 | Schein et al. |
| D531,320 S | 10/2006 | Garland et al. |
| 7,157,222 B2 | 1/2007 | Khirabadi et al. |
| 7,176,015 B2 | 2/2007 | Alford et al. |
| 7,240,513 B1 * | 7/2007 | Conforti ................ A45C 13/02 |
| | | 62/457.2 |
| 7,270,946 B2 | 9/2007 | Brockbank et al. |
| 7,294,278 B2 | 11/2007 | Spears et al. |
| 7,316,922 B2 | 1/2008 | Streeter |
| 7,326,564 B2 | 2/2008 | Lundell et al. |
| 7,361,365 B2 | 4/2008 | Birkett et al. |
| 7,410,474 B1 | 8/2008 | Friend et al. |
| D576,488 S | 9/2008 | Miota et al. |
| 7,504,201 B2 | 3/2009 | Taylor et al. |
| 7,572,622 B2 | 8/2009 | Hassanein et al. |
| 7,651,835 B2 | 1/2010 | Hassanein et al. |
| 7,678,563 B2 | 3/2010 | Wright et al. |
| 7,691,622 B2 | 4/2010 | Garland et al. |
| 7,749,693 B2 | 7/2010 | Brassil et al. |
| 7,811,808 B2 | 10/2010 | van der Plaats et al. |
| 7,824,848 B2 | 11/2010 | Owen et al. |
| D630,318 S | 1/2011 | Goodwin |
| 7,897,327 B2 | 3/2011 | Millis et al. |
| 8,097,449 B2 | 1/2012 | Garland et al. |
| 8,152,367 B2 | 4/2012 | Roberts et al. |
| D664,261 S | 7/2012 | Kravitz et al. |
| 8,268,547 B2 | 9/2012 | Owen et al. |
| 8,268,612 B2 | 9/2012 | Owen et al. |
| 8,304,181 B2 | 11/2012 | Hassanein et al. |
| D672,466 S | 12/2012 | Kravitz et al. |
| 8,323,954 B2 | 12/2012 | Kravitz et al. |
| 8,361,091 B2 | 1/2013 | Schein et al. |
| 8,420,380 B2 | 4/2013 | Fishman et al. |
| 8,465,970 B2 | 6/2013 | Hassanein et al. |
| D692,159 S | 10/2013 | Judson et al. |
| D692,160 S | 10/2013 | Judson et al. |
| 8,613,202 B2 | 12/2013 | Williams |
| D697,224 S | 1/2014 | Judson et al. |
| 8,685,709 B2 | 4/2014 | Bunegin et al. |
| 8,785,116 B2 | 7/2014 | Anderson et al. |
| 8,802,425 B2 | 8/2014 | Ferrera |
| D713,972 S | 9/2014 | Judson et al. |
| D714,461 S | 9/2014 | Judson et al. |
| D714,462 S | 9/2014 | Judson et al. |
| 8,828,034 B2 | 9/2014 | Kravitz et al. |
| 8,828,710 B2 | 9/2014 | Anderson et al. |
| 8,835,158 B2 | 9/2014 | Judson et al. |
| D727,492 S | 4/2015 | Scampoli |
| D734,868 S | 7/2015 | Gilboa |
| 9,089,126 B2 | 7/2015 | Faulkner et al. |
| 9,155,297 B2 | 10/2015 | Anderson et al. |
| 9,247,728 B2 | 2/2016 | Fishman et al. |
| 9,253,976 B2 | 2/2016 | Anderson et al. |
| 9,259,562 B2 | 2/2016 | Steinman et al. |
| 9,357,767 B2 | 6/2016 | Steinman et al. |
| 9,426,979 B2 | 8/2016 | Anderson et al. |
| D765,874 S | 9/2016 | Judson et al. |
| 9,560,846 B2 | 2/2017 | Anderson et al. |
| D787,696 S | 5/2017 | Schmieta et al. |
| D791,939 S | 7/2017 | Turturro et al. |
| 9,867,368 B2 | 1/2018 | Anderson et al. |
| 9,910,000 B2 | 3/2018 | Lynam et al. |

(56) References Cited

U.S. PATENT DOCUMENTS

| | | | |
|---|---|---|---|
| 9,936,689 B2 | 4/2018 | Anderson et al. | |
| D819,223 S | 5/2018 | Judson et al. | |
| 10,076,112 B2 | 9/2018 | Hassanein et al. | |
| 10,085,441 B2 | 10/2018 | Steinman et al. | |
| D861,161 S | 9/2019 | Schuessler | |
| D882,077 S | 4/2020 | Schmitt | |
| D884,887 S | 5/2020 | Kangastupa | |
| D901,680 S | 11/2020 | Guala | |
| 10,918,102 B2 | 2/2021 | Uygun et al. | |
| D912,245 S | 3/2021 | Grudo et al. | |
| 11,089,775 B2 | 8/2021 | Anderson et al. | |
| 11,166,452 B2 | 11/2021 | Judson et al. | |
| 11,178,866 B2 | 11/2021 | Anderson et al. | |
| D963,194 S | 9/2022 | Bixon et al. | |
| 11,472,625 B2* | 10/2022 | Mirzaee Kakhki | B65D 81/18 |
| 11,528,903 B1 | 12/2022 | He et al. | |
| D975,273 S | 1/2023 | Theriot | |
| 11,576,371 B2 | 2/2023 | Legallais et al. | |
| 11,632,951 B2 | 4/2023 | Collette et al. | |
| 11,659,834 B2 | 5/2023 | Judson et al. | |
| D999,370 S | 9/2023 | Wade et al. | |
| D1,002,868 S | 10/2023 | Bixon et al. | |
| D1,003,434 S | 10/2023 | Fangrow | |
| 11,785,938 B2 | 10/2023 | Clavien et al. | |
| D1,016,251 S | 2/2024 | Castriotta et al. | |
| D1,031,028 S | 6/2024 | Bornhoft et al. | |
| 12,035,708 B2 | 7/2024 | Anderson et al. | |
| 12,052,985 B2 | 8/2024 | Anderson et al. | |
| 12,070,029 B2 | 8/2024 | Collette et al. | |
| 12,096,765 B1 | 9/2024 | Anderson et al. | |
| 12,121,023 B1 | 10/2024 | Anderson et al. | |
| 12,161,110 B2 | 12/2024 | Collette et al. | |
| 12,178,206 B2 | 12/2024 | Collette et al. | |
| 12,245,585 B2 | 3/2025 | Judson et al. | |
| 12,245,586 B2 | 3/2025 | Anderson et al. | |
| 12,279,610 B2 | 4/2025 | Anderson et al. | |
| 12,310,357 B2 | 5/2025 | Collette et al. | |
| 12,342,810 B2 | 7/2025 | Anderson et al. | |
| 12,357,533 B2 | 7/2025 | Bulka et al. | |
| 12,369,576 B2 | 7/2025 | Anderson et al. | |
| D1,087,382 S | 8/2025 | Macari et al. | |
| 12,410,408 B2 | 9/2025 | Macari et al. | |
| 2001/0025191 A1 | 9/2001 | Montgomery | |
| 2002/0042131 A1 | 4/2002 | Brockbank et al. | |
| 2002/0051779 A1 | 5/2002 | Gage et al. | |
| 2002/0064768 A1 | 5/2002 | Polyak et al. | |
| 2002/0068360 A1 | 6/2002 | Brockbank et al. | |
| 2002/0115634 A1 | 8/2002 | Polyak et al. | |
| 2002/0138013 A1 | 9/2002 | Guerrero et al. | |
| 2002/0177117 A1 | 11/2002 | Wolf | |
| 2003/0022148 A1 | 1/2003 | Seki | |
| 2003/0053998 A1 | 3/2003 | Daemen et al. | |
| 2003/0054540 A1 | 3/2003 | Alford et al. | |
| 2003/0080126 A1 | 5/2003 | Voute et al. | |
| 2003/0118980 A1 | 6/2003 | Taylor | |
| 2003/0125804 A1 | 7/2003 | Kruse et al. | |
| 2003/0180704 A1 | 9/2003 | Brockbank et al. | |
| 2004/0014199 A1 | 1/2004 | Streeter | |
| 2004/0038192 A1 | 2/2004 | Brasile | |
| 2004/0038193 A1 | 2/2004 | Brasile | |
| 2004/0045314 A1* | 3/2004 | Roth | F25D 3/08 62/530 |
| 2004/0058432 A1 | 3/2004 | Owen et al. | |
| 2004/0067480 A1 | 4/2004 | Brockbank et al. | |
| 2004/0111104 A1 | 6/2004 | Schein et al. | |
| 2004/0170950 A1 | 9/2004 | Prien | |
| 2004/0171138 A1 | 9/2004 | Hassanein et al. | |
| 2004/0221719 A1 | 11/2004 | Wright et al. | |
| 2004/0224298 A1 | 11/2004 | Brasil et al. | |
| 2004/0224299 A1 | 11/2004 | Garland et al. | |
| 2004/0241634 A1 | 12/2004 | Millis et al. | |
| 2004/0248281 A1 | 12/2004 | Wright et al. | |
| 2005/0100876 A1 | 5/2005 | Khirabadi et al. | |
| 2005/0147958 A1 | 7/2005 | Hassanein et al. | |
| 2005/0153271 A1 | 7/2005 | Wenrich | |
| 2005/0221269 A1 | 10/2005 | Taylor et al. | |
| 2005/0233299 A1 | 10/2005 | Sawa et al. | |
| 2005/0255442 A1 | 11/2005 | Brassil et al. | |
| 2005/0277106 A1 | 12/2005 | Daemen et al. | |
| 2006/0019388 A1 | 1/2006 | Hutmacher et al. | |
| 2006/0063142 A1 | 3/2006 | Owen et al. | |
| 2006/0121439 A1 | 6/2006 | Baker | |
| 2006/0121512 A1 | 6/2006 | Parenteau | |
| 2006/0121605 A1 | 6/2006 | Parenteau | |
| 2006/0141077 A1 | 6/2006 | Pettersson | |
| 2006/0148062 A1 | 7/2006 | Hassanein et al. | |
| 2006/0154357 A1 | 7/2006 | Hassanein et al. | |
| 2006/0154358 A1 | 7/2006 | Hassanein et al. | |
| 2006/0154359 A1 | 7/2006 | Hassanein et al. | |
| 2006/0160204 A1 | 7/2006 | Hassanein et al. | |
| 2006/0168985 A1 | 8/2006 | Gano | |
| 2006/0233986 A1 | 10/2006 | Gutsche et al. | |
| 2006/0292544 A1 | 12/2006 | Hassanein et al. | |
| 2007/0009881 A1 | 1/2007 | Arzt et al. | |
| 2007/0015131 A1 | 1/2007 | Arzt et al. | |
| 2007/0028642 A1 | 2/2007 | Glade et al. | |
| 2007/0166292 A1 | 7/2007 | Brasile | |
| 2007/0184545 A1 | 8/2007 | Plaats et al. | |
| 2007/0190636 A1 | 8/2007 | Hassanein et al. | |
| 2007/0193297 A1 | 8/2007 | Wilson | |
| 2007/0243518 A1 | 10/2007 | Sema et al. | |
| 2007/0264485 A1 | 11/2007 | Stepanian et al. | |
| 2007/0275364 A1 | 11/2007 | Hassanein et al. | |
| 2008/0017194 A1 | 1/2008 | Hassanein et al. | |
| 2008/0070229 A1 | 3/2008 | Streeter | |
| 2008/0070302 A1 | 3/2008 | Brockbank et al. | |
| 2008/0096184 A1 | 4/2008 | Brasile | |
| 2008/0145919 A1* | 6/2008 | Franklin | A01N 1/144 435/284.1 |
| 2008/0187901 A1 | 8/2008 | Doorschodt et al. | |
| 2008/0234768 A1 | 9/2008 | Hassanein et al. | |
| 2008/0286747 A1 | 11/2008 | Curtis et al. | |
| 2008/0288399 A1 | 11/2008 | Curtis et al. | |
| 2008/0311552 A1 | 12/2008 | Min | |
| 2009/0078699 A1 | 3/2009 | Mustafa et al. | |
| 2009/0197240 A1 | 8/2009 | Fishman et al. | |
| 2009/0197241 A1 | 8/2009 | Fishman et al. | |
| 2009/0197292 A1 | 8/2009 | Fishman et al. | |
| 2009/0197324 A1 | 8/2009 | Fishman et al. | |
| 2009/0197325 A1 | 8/2009 | Fishman et al. | |
| 2009/0199904 A1 | 8/2009 | Babbitt et al. | |
| 2009/0226878 A1 | 9/2009 | Taylor et al. | |
| 2009/0240277 A1 | 9/2009 | Connors et al. | |
| 2009/0291486 A1 | 11/2009 | Wenrich | |
| 2010/0015592 A1 | 1/2010 | Doorschodt | |
| 2010/0028850 A1 | 2/2010 | Brassil | |
| 2010/0056966 A1 | 3/2010 | Toth | |
| 2010/0086907 A1 | 4/2010 | Bunegin et al. | |
| 2010/0112542 A1 | 5/2010 | Wright et al. | |
| 2010/0151559 A1 | 6/2010 | Garland et al. | |
| 2010/0171802 A1 | 7/2010 | Lee et al. | |
| 2010/0175393 A1 | 7/2010 | Burke et al. | |
| 2010/0209902 A1 | 8/2010 | Zal et al. | |
| 2010/0216110 A1 | 8/2010 | Brockbank | |
| 2010/0221696 A1 | 9/2010 | Owen et al. | |
| 2010/0233670 A1 | 9/2010 | Gavish | |
| 2010/0234928 A1 | 9/2010 | Rakhorst et al. | |
| 2011/0033916 A1 | 2/2011 | Hutzenlaub et al. | |
| 2011/0039253 A1 | 2/2011 | Owen et al. | |
| 2011/0053256 A1 | 3/2011 | Owen et al. | |
| 2011/0059429 A1 | 3/2011 | Owen et al. | |
| 2011/0065169 A1 | 3/2011 | Steen et al. | |
| 2011/0129810 A1 | 6/2011 | Owen et al. | |
| 2011/0129908 A1 | 6/2011 | Owen et al. | |
| 2011/0136096 A1 | 6/2011 | Hassanein et al. | |
| 2011/0173023 A1 | 7/2011 | LeClair et al. | |
| 2011/0177487 A1 | 7/2011 | Simsir et al. | |
| 2011/0183310 A1 | 7/2011 | Kravitz et al. | |
| 2011/0212431 A1 | 9/2011 | Bunegin et al. | |
| 2011/0217689 A1 | 9/2011 | Bunegin et al. | |
| 2012/0042976 A1 | 2/2012 | Toledo | |
| 2012/0116152 A1 | 5/2012 | Faulkner et al. | |
| 2012/0148542 A1 | 6/2012 | Kravitz | |
| 2012/0264104 A1 | 10/2012 | Ferrera | |

(56)  References Cited

U.S. PATENT DOCUMENTS

| | | |
|---|---|---|
| 2012/0266564 A1 | 10/2012 | Haarmann et al. |
| 2012/0301952 A1 | 11/2012 | Anderson et al. |
| 2012/0309078 A1 | 12/2012 | Anderson et al. |
| 2013/0177897 A1 | 7/2013 | Kravitz et al. |
| 2014/0041403 A1 | 2/2014 | Anderson et al. |
| 2014/0087357 A1 | 3/2014 | Kohl et al. |
| 2014/0140815 A1 | 5/2014 | Shener-Irmakoglu et al. |
| 2014/0314881 A1 | 10/2014 | Reynolds et al. |
| 2014/0349273 A1 | 11/2014 | Anderson et al. |
| 2014/0356850 A1 | 12/2014 | Anderson et al. |
| 2014/0356933 A1 | 12/2014 | Anderson et al. |
| 2014/0377880 A1 | 12/2014 | Emburgh et al. |
| 2015/0017627 A1 | 1/2015 | Anderson et al. |
| 2015/0204598 A1 | 7/2015 | Affleck et al. |
| 2015/0209017 A1 | 7/2015 | Fleming et al. |
| 2015/0230453 A1 | 8/2015 | Fontes et al. |
| 2015/0373967 A1 | 12/2015 | Anderson et al. |
| 2016/0074234 A1 | 3/2016 | Abichandani et al. |
| 2016/0095310 A1 | 4/2016 | Anderson et al. |
| 2016/0183517 A1 | 6/2016 | Potenziano |
| 2016/0271015 A1 | 9/2016 | Wengreen et al. |
| 2016/0347532 A1 | 12/2016 | McCormick |
| 2016/0362240 A1 | 12/2016 | Ferracamo, Jr. |
| 2016/0374332 A1 | 12/2016 | Hassanein et al. |
| 2017/0113181 A1 | 4/2017 | Sinstedten et al. |
| 2018/0000068 A1 | 1/2018 | Peralta |
| 2018/0132478 A1 | 5/2018 | Anderson et al. |
| 2018/0352807 A1 | 12/2018 | Judson et al. |
| 2019/0038388 A1 | 2/2019 | Schmitt et al. |
| 2019/0175394 A1 | 6/2019 | Kim |
| 2019/0320649 A1 | 10/2019 | Bunegin |
| 2019/0374693 A1 | 12/2019 | Kheradvar et al. |
| 2020/0187490 A1 | 6/2020 | Kravitz et al. |
| 2020/0253195 A1 | 8/2020 | Bagnato et al. |
| 2020/0278339 A1 | 9/2020 | Wang et al. |
| 2020/0375178 A1 | 12/2020 | Becker et al. |
| 2021/0235691 A1 | 8/2021 | Collette et al. |
| 2021/0392873 A1 | 12/2021 | Anderson et al. |
| 2021/0400952 A1 | 12/2021 | Judson et al. |
| 2021/0400953 A1 | 12/2021 | Anderson et al. |
| 2022/0007368 A1 | 1/2022 | Tang et al. |
| 2022/0007638 A1 | 1/2022 | Judson et al. |
| 2022/0256838 A1 | 8/2022 | Anderson et al. |
| 2022/0322658 A1 | 10/2022 | Keshavjee et al. |
| 2023/0059208 A1 | 2/2023 | Shelton et al. |
| 2023/0073834 A1 | 3/2023 | Luke |
| 2023/0089628 A1 | 3/2023 | Freed |
| 2023/0092486 A1 | 3/2023 | Pettinato et al. |
| 2023/0284613 A1 | 9/2023 | Filgate et al. |
| 2023/0284614 A1 | 9/2023 | Anderson et al. |
| 2023/0337659 A1 | 10/2023 | Judson et al. |
| 2024/0389576 A1 | 11/2024 | Anderson et al. |
| 2024/0389577 A1 | 11/2024 | Anderson et al. |
| 2024/0415110 A1 | 12/2024 | Anderson et al. |
| 2025/0064052 A1 | 2/2025 | Bulka et al. |
| 2025/0064674 A1 | 2/2025 | Bulka et al. |
| 2025/0072415 A1 | 3/2025 | Anderson et al. |
| 2025/0072416 A1 | 3/2025 | Anderson et al. |
| 2025/0089704 A1 | 3/2025 | Collette et al. |
| 2025/0198984 A1 | 6/2025 | Patel |
| 2025/0204518 A1 | 6/2025 | Patel |
| 2025/0248390 A1 | 8/2025 | Macari et al. |
| 2025/0302032 A1 | 10/2025 | Anderson et al. |
| 2025/0311717 A1 | 10/2025 | Churchill et al. |
| 2025/0311718 A1 | 10/2025 | Churchill et al. |
| 2025/0311719 A1 | 10/2025 | Churchill et al. |
| 2025/0318519 A1 | 10/2025 | Judson et al. |

FOREIGN PATENT DOCUMENTS

| | | |
|---|---|---|
| CA | 2775327 | 3/2011 |
| CA | 3149024 | 3/2021 |
| CH | 551741 | 7/1974 |
| CN | 100402103 C | 7/2008 |
| CN | 101322861 | 12/2008 |
| CN | 104619169 | 5/2015 |
| CN | 105660603 | 6/2016 |
| CN | 205337358 | 6/2016 |
| CN | 107183005 | 9/2017 |
| CN | 112806351 | 5/2021 |
| CN | 308966732 | 11/2024 |
| DE | 19922310 | 11/2000 |
| DE | 10-2005-048625 | 4/2007 |
| EP | 0376763 | 7/1990 |
| EP | 1017274 | 11/2003 |
| EP | 2278874 | 2/2011 |
| EP | 2480069 | 8/2012 |
| FR | 2830077 | 4/2004 |
| JP | H08-169801 | 7/1996 |
| JP | 2000-279519 | 10/2000 |
| JP | 3775098 | 5/2006 |
| JP | 2008-120713 | 5/2008 |
| KR | 10-1499735 | 3/2015 |
| WO | WO 1991/03934 | 4/1991 |
| WO | WO 1994/09274 | 4/1994 |
| WO | WO 1995/12973 | 5/1995 |
| WO | WO 1996/30111 | 10/1996 |
| WO | WO 1997/43899 | 11/1997 |
| WO | WO 1999/15011 | 4/1999 |
| WO | WO 2000/18225 | 4/2000 |
| WO | WO 2000/18226 | 4/2000 |
| WO | WO 2000/60935 | 10/2000 |
| WO | WO 2001/03505 | 1/2001 |
| WO | WO 2001/37719 | 5/2001 |
| WO | WO 2001/54495 | 8/2001 |
| WO | WO 2001/78504 | 10/2001 |
| WO | WO 2001/78505 | 10/2001 |
| WO | WO 2001/95717 | 12/2001 |
| WO | WO 2002/17714 | 3/2002 |
| WO | WO 2002/26034 | 4/2002 |
| WO | WO 2002/32225 | 4/2002 |
| WO | WO 2002/089571 | 11/2002 |
| WO | WO 2004/017838 | 3/2004 |
| WO | WO 2004/026031 | 4/2004 |
| WO | WO 2004/052101 | 6/2004 |
| WO | WO 2004/089085 | 10/2004 |
| WO | WO 2004/089090 | 10/2004 |
| WO | WO 2004/105484 | 12/2004 |
| WO | WO 2004/110146 | 12/2004 |
| WO | WO 2005/022994 | 3/2005 |
| WO | WO 2005/074681 | 8/2005 |
| WO | WO 2005/099588 | 10/2005 |
| WO | WO 2006/033674 | 3/2006 |
| WO | WO 2006/042138 | 4/2006 |
| WO | WO 2006/052133 | 5/2006 |
| WO | WO 2006/060709 | 6/2006 |
| WO | WO 2006/101393 | 9/2006 |
| WO | WO 2007/025215 | 3/2007 |
| WO | WO 2007/111495 | 10/2007 |
| WO | WO 2007/124044 | 11/2007 |
| WO | WO 2008/108996 | 9/2008 |
| WO | WO 2008/144021 | 11/2008 |
| WO | WO 2008/150587 | 12/2008 |
| WO | WO 2009/020412 | 2/2009 |
| WO | WO 2009/041806 | 4/2009 |
| WO | WO 2009/099939 | 8/2009 |
| WO | WO 2009/132018 | 10/2009 |
| WO | WO 2010/084424 | 7/2010 |
| WO | WO 2010/096821 | 8/2010 |
| WO | WO 2011/038251 | 3/2011 |
| WO | WO 2012/125782 | 9/2012 |
| WO | WO 2013/068752 | 5/2013 |
| WO | WO 2014/026119 | 2/2014 |
| WO | WO 2014/026128 | 2/2014 |
| WO | WO 2015/021513 | 2/2015 |
| WO | WO 2015/126853 | 8/2015 |
| WO | WO 2017/205967 | 12/2017 |
| WO | WO 2017/205987 | 12/2017 |
| WO | WO 2018/015548 | 1/2018 |
| WO | WO 2018/112072 | 6/2018 |
| WO | WO 2018/184100 | 10/2018 |
| WO | WO 2018/226993 | 12/2018 |
| WO | WO 2020/061202 | 3/2020 |
| WO | WO 2020/252148 | 12/2020 |

(56)                    References Cited

FOREIGN PATENT DOCUMENTS

| WO | WO 2021/041181 | 3/2021 |
|----|----------------|--------|
| WO | WO 2021/155147 | 8/2021 |
| WO | WO 2023/215611 | 11/2023 |
| WO | WO 2024/044385 | 2/2024 |
| WO | WO 2024/054588 | 3/2024 |
| WO | WO 2025/049335 | 3/2025 |
| WO | WO 2025/166189 | 7/2025 |
| WO | WO 2025/217060 | 10/2025 |

OTHER PUBLICATIONS

Kidney Transport, retrieved online on Feb. 27, 2025, at: https://fluctus.nl/en/portfolio/kidney-assist/, publication date unknown.

Michel et al., "Innovative cold storage of donor organs using the Paragonix Sherpa Pak™ devices", Heart Lung and Vessels, vol. 7(3):246-255 (2015) XP093292267, retrieved from the internet on Jul. 2, 2025 at: https://pmc.ncbi.nlm.nih.gov/articles/PMC4593023/pdf/hlv-07-246.pdf.

Watanabe et al., "Ex vivo lung perfusion", J Thorac Dis, vol. 13(11):6602-6617 (2021).

Yufer et al., "A tissue impendance measurement chip for myocardial ischemia detection", IEEE Transactions on Circuits and Systems-I:Regular Papers, vol. 52(12):2620-2628 (2005).

Briceno et al., "Back-table surgery pancreas allograft for transplantation: Implications in complications", World Journal of Transplantation, vol. 11(1):1-6 (2021).

Brown, "Chemical measurements of inulin concentrations in peritoneal dialysis solution", Clin. Chim. vol. 76:103-112 (1977).

Bunegin et al., Interstitial pO2 and high energy phosphates in the canine heart during hypothermic preservation in a new, portable, pulsatile perfusion device, from the Department of Anesthesiology University of Texas Health Science Center at San Antonio, Texas; and Center for Cardiovascular Surgery of the Republic of Lithuania, Vilnius, Lithuania, vol. 3(3):1-6 (1998).

Bunegin et al., The Application of Fluidics Technology for perfusion of adult, human sized, canine hearts, from the Department of Anesthesiology, Health Science Center at San Antonio, University of Texas, vol. 8(1/2):73-78 (2003).

Bunegin et al., "The Application of Fluidics Technology for Organ Preservation", Biomedical Instrumentation & Technology, Mar./Apr. 2004, pp. 155-164.

Calhoon et al., "Twelve-Hour Canine Heart Preservation With a Simple, Portable Hypothermic Organ Perfusion Device", r\nn Thorac Surg 1996:62:91-93.

Ceulemans et al., "Combined liver and lung transplantation", American Journal of Transplantation, vol. 14(10):2412-2416 (2014).

Cypel et al., "Extracorporeal lung perfusion", Current Opinion in Organ Transplantation, vol. 21(3):329-335 (2016).

De Perrot, "Lung preservation, Seminars in Thoracic and Cardiovascular Surgery", Saunders, Philadelphia, PA vol. 16(4):300-308 (2004).

Galasso, "Inactivating hepatits C virus in donor lungs using light therapies during normothermic ex vivo lung perfusion", Nature Communications, vol. 10(481):1-12 (2019).

Interview with CEO of Paragonix, posted at tactical-medicine.com, posting date Jul. 12, 2022, retrieved Nov. 14, 2023, online, https://tactical-medicine.com/blogs/news/improving-transplant-survival-with-organ-preservation-tech-interview-with-dr-anderson-ceo-of-paragonix (Year: 2022).

Irish Medicines Board "Viaspan" Summary of Product Characteristics available online at <https://www.hpra.ie/img/_./JcenseSPC_PA0002-075-001_21112012111041.pdf>, Nov. 21, 2012 (6 Pages).

Naoum, "Xometry: Everything you need to know about acrylic and its uses", published May 4, 2022, accessed on Jan. 14, 2025, at https://www.xometry.com/resources/materials/acrylic-pmma/#:~:text=Acrylic%20is%20a%20type%20of,worst%20and%20dysfunctional%20at%20best (2022).

Organ Recovery Systems, Inc., LifePort Brochure, www.organ-recovery.com retrieved Aug. 29, 2012 (12 pages).

Paragonix SherpaPak, posted at .mmcts.org, posting date Jun. 16, 2021, retrieved Nov. 14, 2023, online, https://mmcts.org/utuorial/1657 (Year: 2021).

Raredon et al., "Biomimetic culture reactor for whole lung engineering", BioResearch, vol. 5.1:72-83 (2016).

Steinbrook, The New England Journal of Medicine, "Organ Donation after Cardiac Death", Jul. 9, 2007 (5 pages).

T'Hart, "New solutions in organ preservation", Transplantation Reviews, vol. 16:131-141 (2006).

Tolstykh et al., "Novel portable hypothermic pulsatile perfusion preservation technology: Improved viability and function of rodent and canine kidneys", Ann Transplant, 2010; 15(3):1-9.

Tolstykh et al., "Perfusion preservation of rodent kidneys in a portable preservation device based on fuidics technology", Transplantation, vol. 73(9):1508-1526 (2002).

Vries et al., "Systms engineering the organ preservation process for transplantation", Current Opinion in Biotechnology, vol. 58:192-201 (2019).

Wandall et al., "Galactosylation does not prevent the rapid clearance of long-term 40C-stored platelets", Blood, vol. 11(6):3249-3256 (2008).

Weegman et al., "Continuous Real-time Viability Assessment of Kidneys Based on Oxygen Consumption", Transplant Proc. 2010; 42(6):2020-2023.

Invitation to Pay Additional Fees in application No. PCT/US2023/032217, mailed on Jan. 8, 2024, in 13 pages.

International Search Report and Written Opinion in application No. PCT/US2023/032217, mailed on Feb. 29, 2024, in 17 pages.

International Preliminary Report on Patentability and Written Opinion in application no. PCT/US2023/032217, dated Mar. 1, 2025, in 11 pages.

Ma et al., "Application and research progress of phase change materials in biomedical field", Biomater. Sci. vol. 9:5762-5780 (2021).

* cited by examiner

201

Substrate: Ceramic, Aluminum etc.

Cold Side

Hot Side p type semiconductor pellet n type semiconductor pellet

Conducting tab: Copper

Wire Leads

601

1550

1554

1556

OUTE BOWL
CONSIDERATION

1762

1764

1452

1450

SMOOTH
SURFACE

209

1656

1620

1622

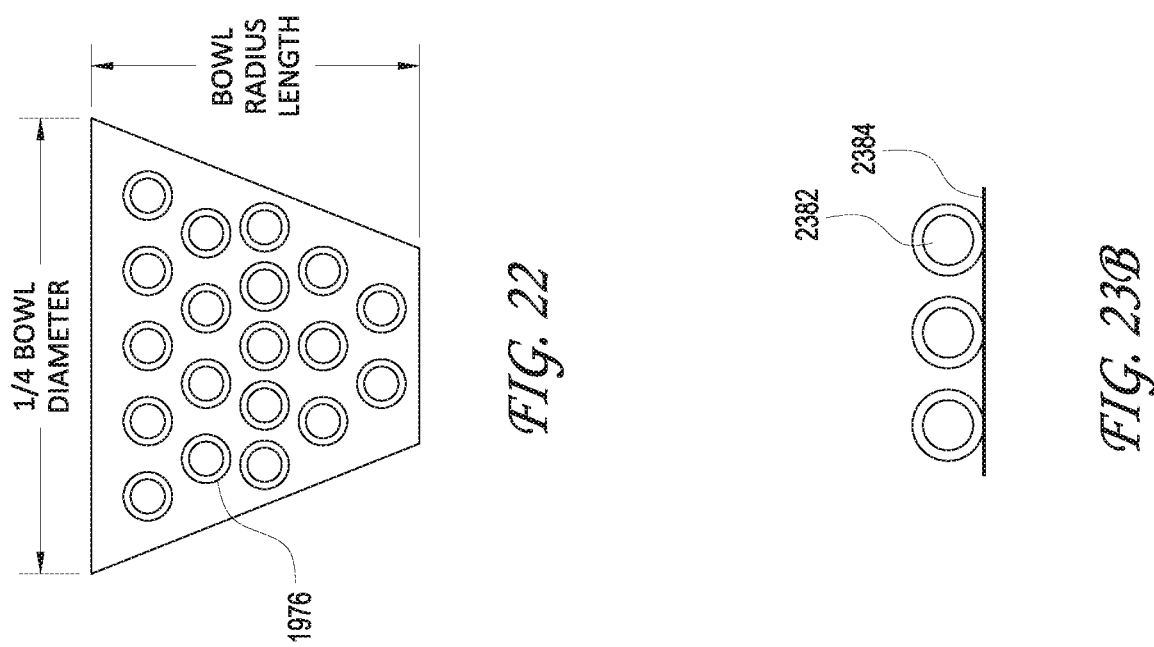
FIG. 22
FIG. 23B
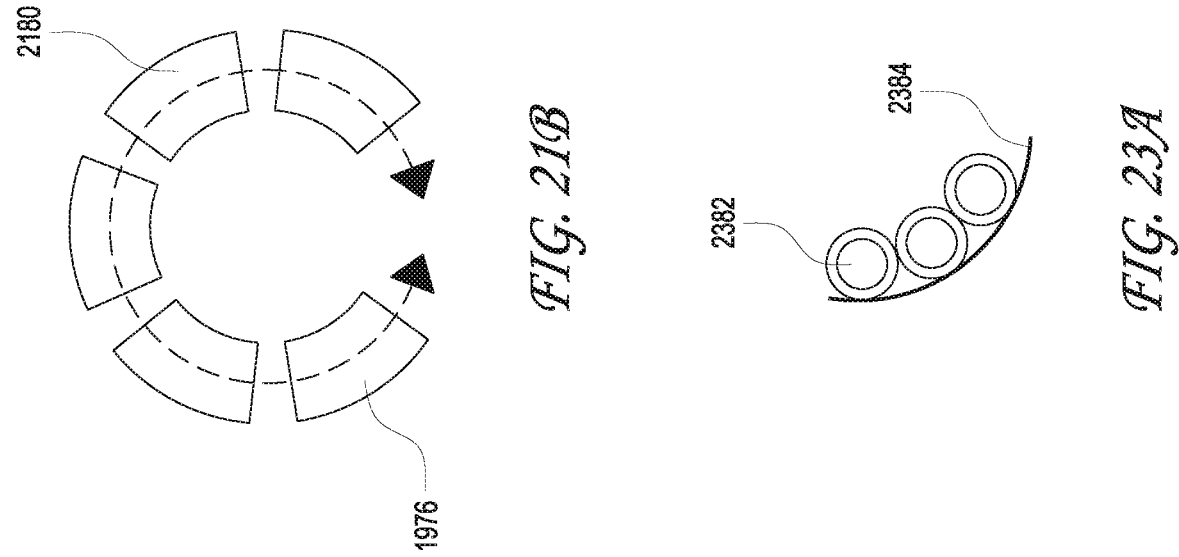
FIG. 21B
FIG. 23A

HYPOTHERMIC TISSUE STORAGE

INCORPORATION BY REFERENCE TO ANY PRIORITY APPLICATIONS

This application is a continuation of PCT Application No. PCT/US2023/032217, filed Sep. 7, 2023, and titled HYPO-THERMIC TISSUE STORAGE, which claims the benefit of U.S. Provisional Application No. 63/404,767, filed Sep. 8, 2022, and titled HYPOTHERMIC TISSUE STORAGE. The aforementioned application is incorporated by reference herein in its entirety.

FIELD OF THE INVENTION

Embodiments of the present invention relate to devices, systems, and methods for hypothermic storage of biological samples, for example tissues for donation. The devices, systems, and methods may provide a secure, sterile, and temperature-controlled environment for storing samples with particular application for preop back table storage during transplant surgery.

BACKGROUND

There is a critical shortage of donor organs. Hundreds of lives could be saved each day if more organs (heart, kidney, lung, etc.) were available for transplant. While the shortage is partly due to a lack of donors, there is a need for better methods of preserving and transporting donated organs. Current storage and preservation methods allow only a small time window between harvest and transplant, typically on the order of hours. These time windows dictate who is eligible to donate organs and who is eligible to receive the donated organs. These time windows also result in eligible organs going unused because they cannot be transported to a recipient in time.

Current preservation methods are available to keep organs viable during transport and within a hospital with transport preservation typically involving simple hypothermic (less than 10° C.) storage. Many transport storage devices sill involve bagging the organ in cold preservation solution and placing the bagged organ in a portable cooler along with ice for the journey (i.e. "picnic cooler" storage). For the most part, the hope is that the preservation solution will reduce swelling and keep the tissues moist, while the cold reduces tissue damage due to hypoxia. More advanced methods include transport systems such as those described in U.S. Pat. No. 11,178,866 incorporated herein by reference in its entirety. Such systems are able to keep an organ in a desired hypothermic temperature range between 2° C. and 8° C. and can provide a number of advanced benefits including per-fusion with oxygenated fluid and temperature and pressure monitoring. However, once a hospital is in receipt of an organ for transplant, it is often reverted to a container of cold fluid and ice on a back table of the operating room for prolonged periods while a recipient is prepped.

The problem is especially relevant to lung transplants. While in certain instances an organ could be left in a well-designed transport container during preparation for the transplant operation, lung transplants require special care. In the recipient hospital the lungs are separated at the bronchi and the first lung is transplanted into the recipient. While the first lung is being transplanted, the second lung is placed in a bowl of sterile slush where it awaits transplantation. The operation could take 1.5 hours or more and the lung is exposed to the same uncontrolled freezing environment that modern transport systems are designed to combat. Liver and kidneys are also at risk of being in a slush on the back table for an extended period of time and could benefit from a solution that would keep them cool in the sterile field in an efficient manner.

SUMMARY

Embodiments disclosed herein provide for improved stor-ing of biological samples, e.g. tissues, such as donor organs, especially in the operating room environment in between arrival at a donor site and actual transplantation. Embodi-ments disclosed herein can help maintain a sterile, tempera-ture-controlled environment similar to those used to maxi-mize tissue viability during transport of donor organs after the organ has arrived at the transplant location. These improved devices, systems and methods, especially when used in combination with the aforementioned transport systems, can greatly expand the window of time for tissue viability outside the body and therefore improve outcomes in organ transplants.

The disclosed system for hypothermic storage overcomes the shortcomings of the prior art by providing a sterile, temperature-stabilized environment for tissue samples (e.g., donor organs) in the operating room in between removal from the transport container and transplantation. Devices, systems and methods disclosed herein accomplish the goals of sterile, temperature-controlled storage without potentially traumatic exposure to jagged surfaces or direct contact with temperature extremes when submerged directly in a frozen slush or slurry as is often the case using standard techniques. Instead, in certain embodiments, the present embodiments offer a dedicated, sterile basin and/or supporting base with either integrated cooling media or cavities for strategic placement of cooling media (e.g., phase change materials (PCM) or active cooling mechanisms such as thermoelectric coolers). The phase change material can be pre-conditioned to the desired cold temperature before utilization. Preserva-tion fluid may also be pre-conditioned to a cold temperature. Thermo-electric coolers may or may not initiate chilling of a bowl in advance (depending on its cooling capacity). The basin can be filled with preservation fluid or other solutions and the cooling media can be configured to maintain a temperature in the fluid, and therefore the tissue, in the desired range between about 2° C. and about 8° C. The basin may include a lid to maintain a sterile environment or may be provided with a sterile pouch in which the tissue can be sealed before submersion or partial submersion in the solu-tion of the basin. In some embodiments described herein, the cooling media can be liquid crystal. Liquid crystal can be a thermodynamic stable phase material. Liquid crystal can be a material that lacks a three-dimensional crystal lattice. Liquid crystal can include thermochromic liquid crystal. In certain examples, thermochromic liquid crystal can exhibit a color based on a temperature or temperature range. Ther-mochromic liquid crystal can be used for temperature dis-plays in the systems, methods, devices, and apparatuses herein and/or for cooling media if suitable. Liquid crystals can have low solidification points. Advantageously, liquid crystal can absorb latent heat while retaining the ability to flow. Liquid crystals used as cooling material can include nematic liquid crystal. In certain embodiments, cooling media can include eutectic cooling blocks. Eutectic cooling blocks can be filled with eutectic solutions. Eutectic solu-tions can be frozen into solid material that absorbs latent heat. Cooling media can include other phase change mate-rials.

The sterile pouch and/or the basin itself may be constructed of an insulative material to provide a thermal barrier between the cooling media and the tissue and/or solution in order to temper exposure to thermal extremes that might damage the tissue. In certain embodiments, the basin may be constructed of or comprise a layer of cushioned material to support the tissue. In various embodiments the basin (or an insert therein) may be tissue or organ specific and may be contoured to support the specific organ in order to maximize surface area contact and minimize any pressure points that might damage the tissue. In certain embodiments, multiple sizes of basins or inserts may be available. For example, a variety of liver cushions may be available that are sized to accommodate organs from donors of different ages, sexes, and/or sizes.

The basin or cushion may be constructed of multiple layers to provide, for example, rigidity necessary to support the sample or organ and maintain separation between it and the cooling media within, under, or around the basin and/or its supportive base. Layers may be selected based on their thermal conductivity to achieve desired insulation and/or thermal isolation of the sample, organ, active or passive cooling mechanisms, and/or any temperature probes. Certain layers may be composed of closed cell foam or other materials to provide insulation and cushioning while some layers may be composed of acrylic polymers or other rigid materials to provide structural support and a physical barrier between the tissue or organ and cooling material. Various layers may have reliefs or cutouts to accommodate and position a temperature probe or other sensor relative to the tissue/organ and cooling material.

In certain embodiments, basins may include an integrated or auxiliary temperature probe. The probe may be positioned within the solution near the tissue in order to provide an accurate temperature for the tissue. In certain embodiments, the basin or layers therein may be configured to accept a temperature probe in order to position the probe relative to the sample/organ to provide an accurate temperature reading (e.g., within +/−1° C.). In certain embodiments, the temperature probe may be coupled with an insulator of equivalent R-value, based on a surface ratio, to the size of the thermistor, to accurately measure temperature. A temperature sensor may be blunted itself or covered by a blunt or rounded jacket in order to reduce the change of physical damage to or piercing of the tissue or organ cause by contact with the temperature probe or sensor.

Aspects disclosed herein can include a system for storing a biological sample comprising: a basin comprising a floor and at least one wall and configured to retain a solution and receive a biological sample at least partially submerged in the solution; and a cooling element positioned underneath the floor operable to maintain a temperature in the solution between about 2° C. and about 8° C. The cooling element may be an integral part of the floor. In certain embodiments, the floor of the basin can comprise a cavity operable to receive and position the cooling element beneath the floor.

In some embodiments, systems may include a separate base operable to support the basin. The base and basin may comprise locating features to position the basin with respect to the base. The base and basin can comprise one or more features operable to removably couple the basin to the base. The base can include a cavity operable to receive and position the cooling element beneath the floor when the basin is supported by the base. In some embodiments, the cooling element may be an integral part of the base.

The cooling element can include one or more of a phase change material (PCM), a thermoelectric cooler (e.g., a Peltier cooler), or a vapor-compression or refrigerant-based system. In some embodiments, systems may further comprising a sterile, insulated pouch for containing the biological sample in the basin and providing an insulative barrier between the biological sample and the solution.

In certain aspects, methods disclosed herein may include storing a biological sample by providing a system comprising: a basin comprising a floor and at least one wall; and a cooling element positioned underneath the floor operable to maintain a temperature in the solution between about 2° C. and about 8° C. Methods may include adding a solution to the basin and at least partially submerging a biological sample in the solution in the basin. In certain embodiments, additional steps may include positioning the basin on a separate base and/or positioning the cooling element in a cavity in the base or basin. Methods may include sealing the biological sample in the sterile, insulated pouch before at least partially submerging the biological sample in the solution in the basin to provide an insulative barrier between the biological sample and the solution.

BRIEF DESCRIPTION OF THE DRAWINGS

FIG. 21B shows an example of packets of cooling media in a pouch with flex areas in a curved position.

FIG. 22 shows an example of a packet of cooling media with example dimensions.

FIG. 23A shows an example of a cooling media packet made up of circular packets in a curved position.

FIG. 23B shows an example of a cooling media packet made up of circular packets in a flat position.

DETAILED DESCRIPTION

Figure 1:
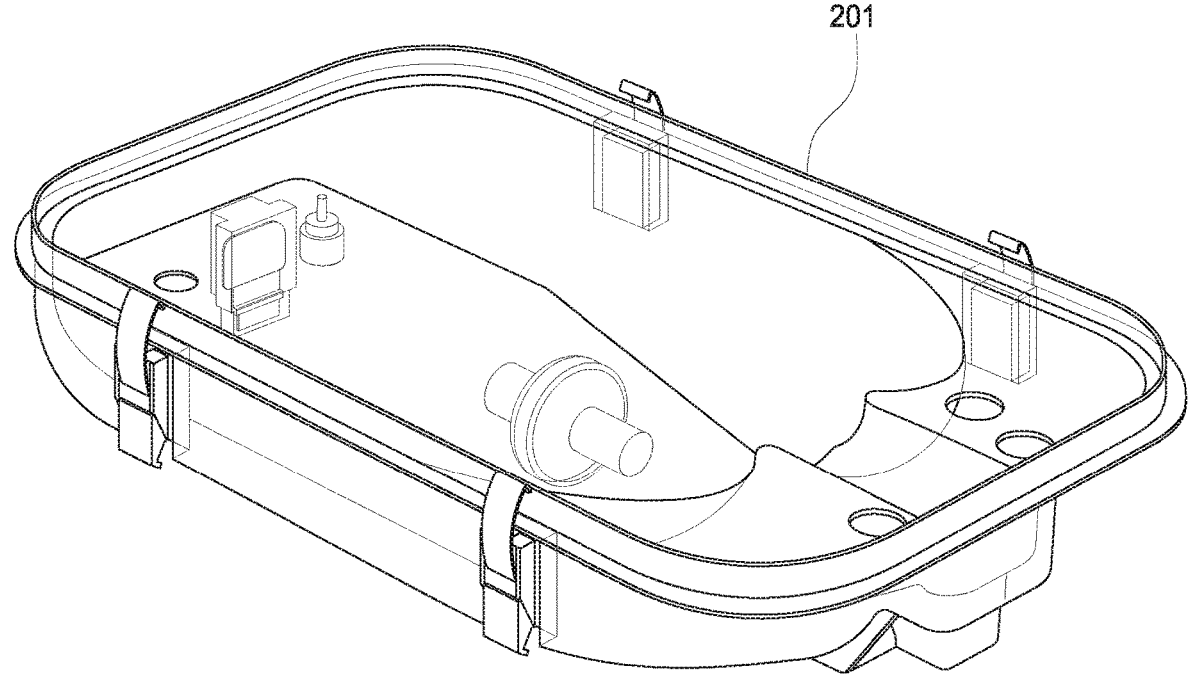
FIG. 1 shows a basin according to certain embodiments.

The disclosed systems for hypothermic storage of tissue or other biological samples or organs provide a sterile, temperature-stabilized environment to prolong viability between arrival at a transplant center and the transplant operation. In particular, devices, systems, and methods disclosed herein can include a basin and/or supportive base having cooling media integrated therein or positioned in cavities therein. Basins may contain a preservation fluid or other solution in which the tissue can be at least partially submerged. The basin may provide a support surfaces to cushion and support the tissue and/or to physically separate the sample from direct exposure to cooling media. Some systems also provide the ability to monitor the temperature, or other properties of the samples and may include alarms to alert users of any issues in order to provide an opportunity for corrective action that may save a donor organ for transplant. Because of these improvements, users of the embodiments disclosed herein can reliably store samples in the operating room with many of the advantages found in current state of the art transport devices, avoiding a previous shortfall in tissue care once the organs arrived at the transplant location. Additionally, because the tissues are then maintained in better condition right up until transplantation, the long-term prognosis for the recipient is improved.

As used in this specification, the singular forms "a," "an" and "the" include plural referents unless the context clearly dictates otherwise. Thus, for example, the term "a fluid" is intended to mean a single fluid or a combination of fluids.

As used herein, "a fluid" refers to a gas, a liquid, or a combination thereof, unless the context clearly dictates otherwise. For example, a fluid can include oxygen, carbon dioxide, or another gas. In another example, a fluid can include a liquid. Specifically, the fluid can be a liquid perfusate. In still another example, the fluid can include a liquid perfusate with a gas, such as oxygen, mixed therein or otherwise diffused therethrough. In certain embodiments, the solution in which the tissue is submerged may be circulated via a pump and, in some instances, may be oxygenated. In some embodiments, the solution may be circulated into the basin via an adapter that may attach to the vasculature of the organ in order to perfuse the organ with oxygenated solution. Exemplary adapters and oxygenation circuits are discussed in U.S. Pat. No. 11,178,866, incorporated herein by reference.

As used herein, "tissue" refers to any tissue of a body of a patient, including tissue that is suitable for being replanted or suspected of being suitable for replantation. Tissue can include, for example, muscle tissue, such as, for example, skeletal muscle, smooth muscle, or cardiac muscle. Specifically, tissue can include a group of tissues forming an organ, such as, for example, the skin, lungs, cochlea, heart, bladder, liver, kidney, or other organ. In another example, tissue can include nervous tissue, such as a nerve, the spinal cord, or another component of the peripheral or central nervous system. In still another example, tissue can include a group of tissues forming a bodily appendage, such as an arm, a leg, a hand, a finger, a thumb, a foot, a toe, an car, genitalia, or another bodily appendage. While the systems are described as relating to the storage of tissues, such as organs, it is also envisioned that the systems could be used for the storage of body fluids, which may be held in another container within the basin. Body fluids may include blood and blood products (whole blood, platelets, red blood cells, etc.) as well as other body fluids for preservation.

Figure 2:
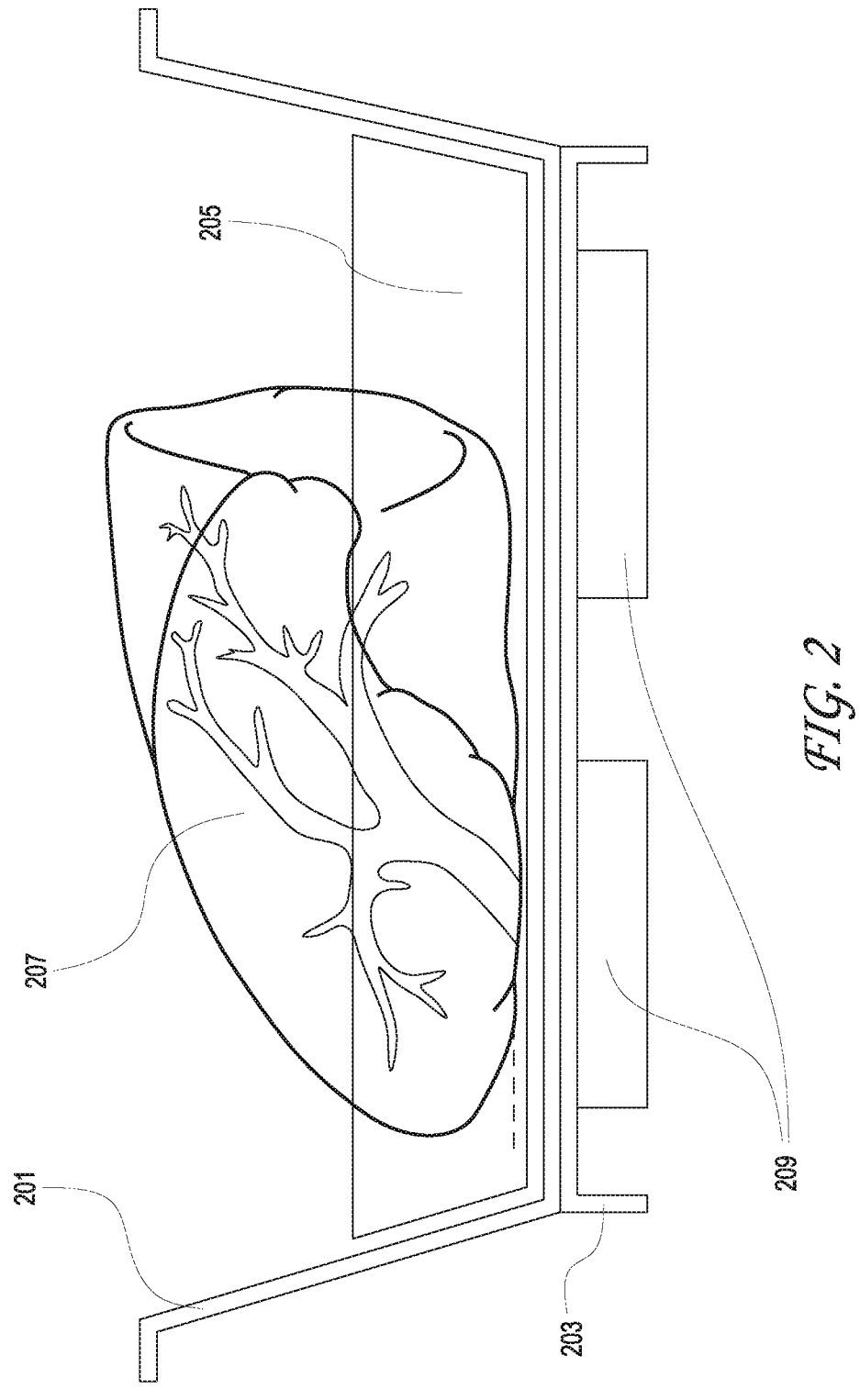
FIG. 2 shows an example of a basin positioned over a base having cavities for cooling media.

In certain embodiments, the basin may be used both in transport and operating room storage as described herein. For example, an inner container, tray, or chamber as described in U.S. Pat. No. 11,178,866 or U.S. patent application Ser. No. 16/857,689, incorporated herein by reference in its entirety may serve as the basin for back table cooling purposes. FIG. 1 illustrates an exemplary embodiment of a basin 201 that may be an inner lung support from a transport container, repurposed as a basin 201. FIG. 2 illustrates a example of basin 201 positioned on a separate base 203 with cavities for receiving and positioning cooling media 209 relative to the basin 201 in order to maintain the tissue 207, at least partially submerged in a solution 205, at a desired temperature. The sample, tissue, or organ to be preserved 207 can be placed (along with preservation fluid) within one or more sterile pouches or bags such as those described in U.S. Pat. No. 11,166,452, incorporated herein by reference in its entirety. In certain embodiments, the tissue, sample, or organ may be entirely submerged in preservation fluid or other solutions 205 within the basin 201. The basin 201 and base 203 may include one or more features (e.g., keyed protrusions and corresponding recesses) in order to align and position the two pieces in a preferred arrangement. In certain embodiments, the base 203 and the basin 201 may include one or more coupling mechanisms (e.g., a draw latch or toggle) allowing a user to removably fasten the two pieces together to form a monolithic unit.

Figure 3:
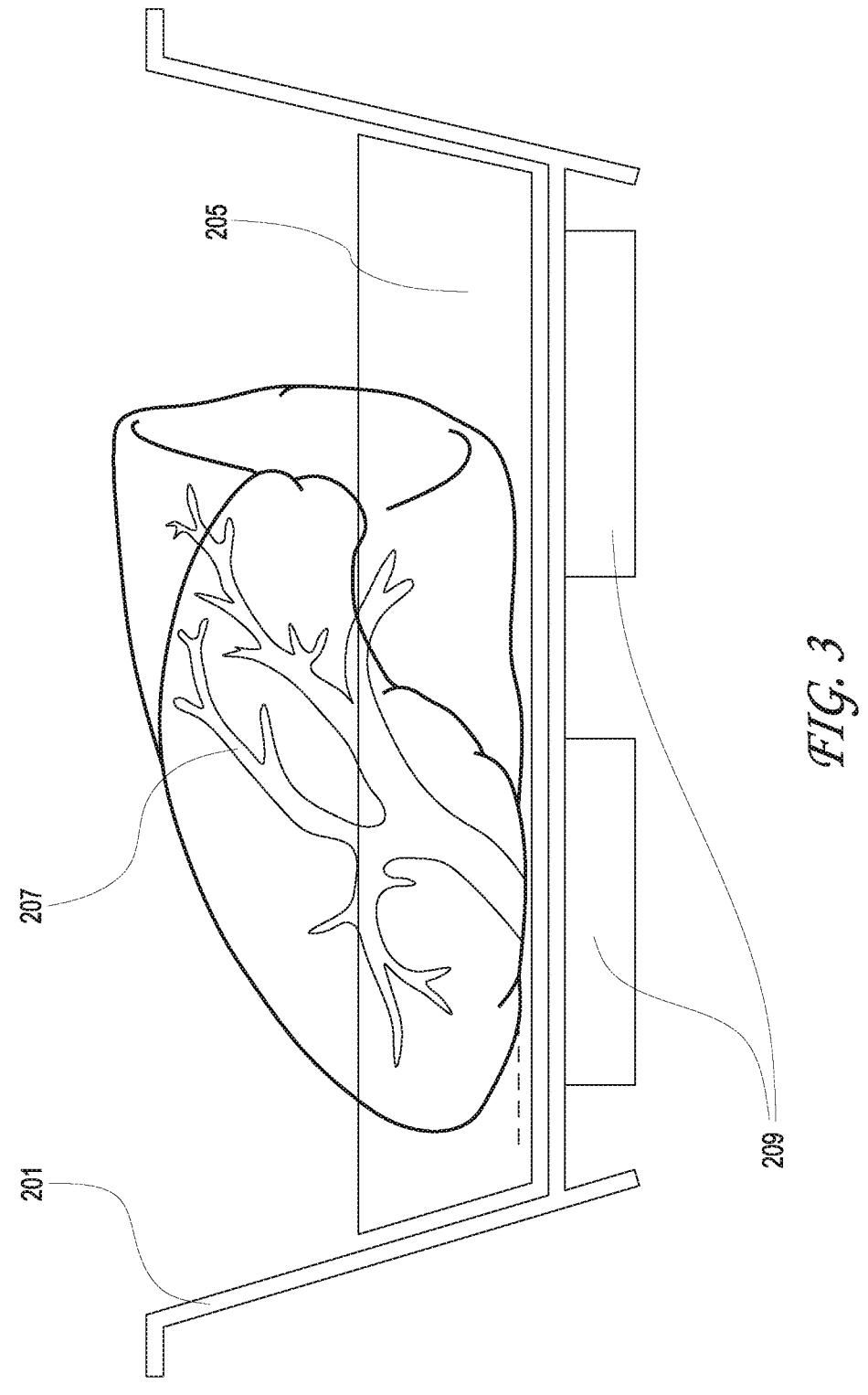
FIG. 3 shows an example of a basin having cavities for cooling media.
Figure 4:
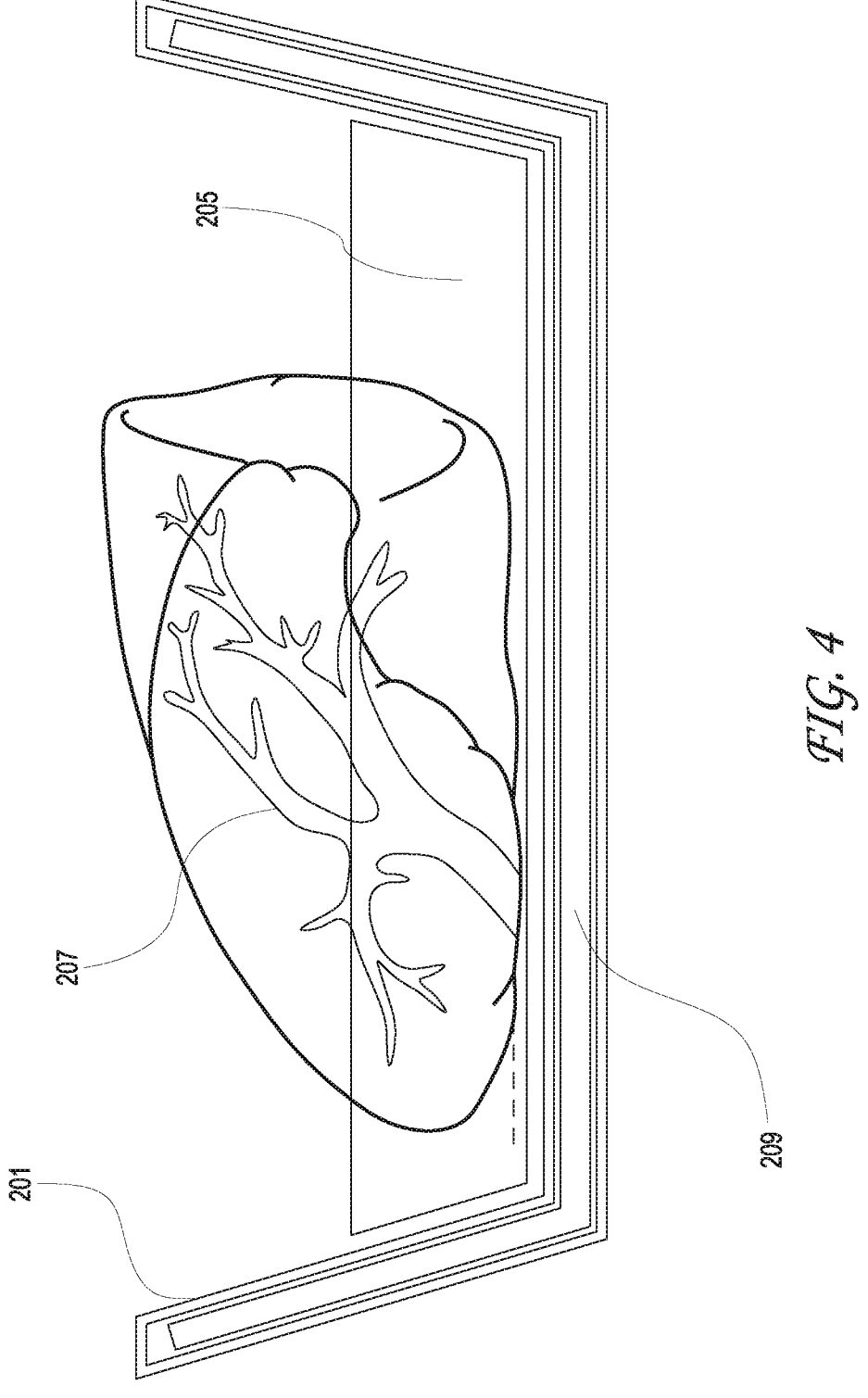
FIG. 4 shows an example of a basin positioned having integrated cooling media.
Figure 5:
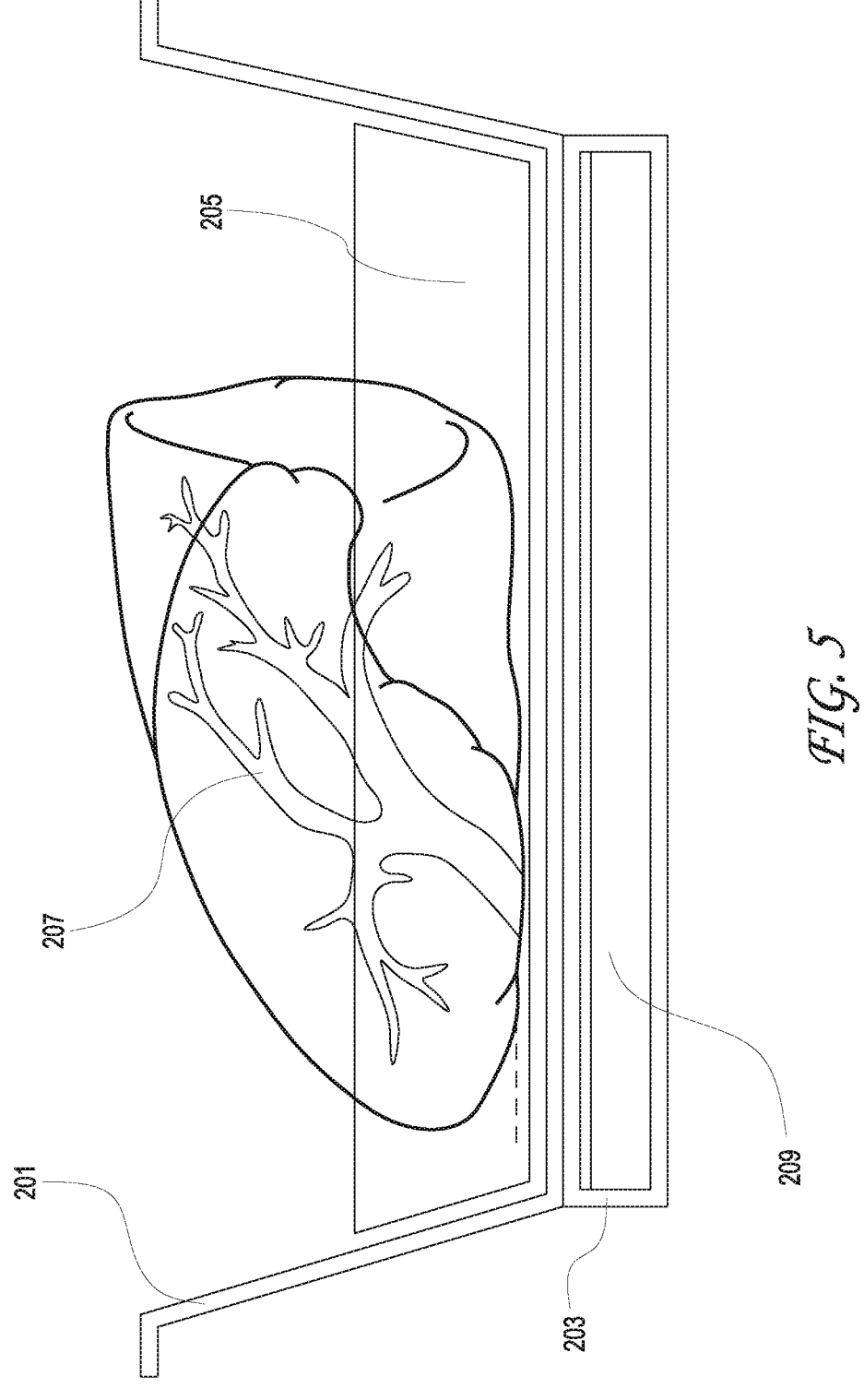
FIG. 5 shows an example of a basin positioned over a base having integrated cooling media.

In certain embodiments, the basin 201 itself may include a skirt or otherwise comprise one or more cavities for positioning cooling media 209 as shown in FIG. 3. In such embodiments, a base may be unnecessary. In some embodiments, a cooling media 209 may be integrated into the basin 201 as shown in FIG. 4 or integrated into the supportive base 203 as shown in FIG. 5. In such embodiments a PCM or other cooling media 209 can be injected or otherwise sealed inside the basin 201 or base 203 or either component may be constructed of a PCM or other cooling media 209 and optionally encased in a plastic or other layer to provide structure and/or insulation for the tissue 207 and solution 205.

Exemplary phase change materials and eutectic cooling blocks are discussed below. The cooling media 209 may be positioned below, above, and/or on the sides of a central cavity in the basin 201 in which the tissue 207 is placed. The basin 201 and/or base 203 may accept a temperature probe which may wirelessly communicate with an output device to provide real-time temperature monitoring for the stored tissue 207 or may be electrically connected to a to a transmitter, display, or other output device via a lead.

Basins or bases disclosed herein may be of various layers including layers constructed from a material with sufficient rigidity to provide support, without significant deformation, of the sample with sufficient depth to retain a desired amount of solution therein. In various embodiments, the basin and/or base may comprise a rigid acrylic polymer or other material to provide a structurally appropriate surface to maintain separation between the passive cooling packets and the solid organ. In preferred embodiments, the material is biocompatible as it may be in contact or close proximity with tissue or an organ. A temperature probe such as a thermistor along with an electrical lead may be secured to the basin and/or base so as to position the probe near the inner surface of the basin near the sample.

One or more insulating layers may be included in the basin and/or base to act as a thermal barrier between cooling material below the insulating layer and the sample on the other side thereof. The insulating layer can include recesses or cutouts to accommodate/position the temperature probe and/or lead. The insulating layer can provide appropriate thermal conductivity between passive cooling packets or active cooling mechanisms and the solid organ or other biological samples. The insulating layer may have a thermal conductivity of less than about 0.1 W/mK or, in some embodiments, less than about 0.05 W/mK. In certain embodiments, the insulating layer may be constructed of a closed cell foam such as Plastazone LD24 (available from Zotefoams Plc, UK) with a thermal conductivity of about 0.04 W/mK. The insulating layer may contain a cutout or relief to accept and position an insulator plug between the temperature probe and cooling material below in order to more accurately measure the temperature of the sample without interference from the cooling material itself. In various embodiments, insulating layers may comprise expanded polystyrene.

In various embodiments, the temperature probe may comprise a thermistor or other temperature sensor situated or affixed inside of a blunt-tip jacket (e.g., a stainless steel or other medically acceptable material) in order protect the thermistor and/or probe tip from piercing or otherwise damaging the tissue or any isolation bags which might contain the sample and/or preservation fluid. In some embodiments, a temperature probe may be placed directly in the solution 205 in order to provide a temperature reading for the tissue 207 therein.

In some embodiments, one or more cushion layers may be provided near the interior surface of the basin in order to provide an atraumatic cushion for the organ or other sample to rest on. The cushion layer may be specifically utilized to protect the sample from bouncing on a hard surface and/or sliding within the device on a smooth surface if jostled during storage and to protect against thermal conductivity of any structural layers below. The cushion layer may comprise a closed cell foam as with insulation layers (e.g., Plastazote LD24) and may provide further thermal insulation to more conductive polymer layers underneath. The inner surface of the basin and/or any sample container bags (e.g., organ bags exemplified in U.S. Pat. No. 11,166,452) may be textured in order to increase friction and reduce sliding or other lateral movement of the organ relative to the support surface.

Accordingly, a basin/base as described herein can remove direct contact with a cold energy source and provide an atraumatic cushion for the sample. In various embodiments, the basin itself or an insert thereon may be curved or otherwise shaped to accommodate curvature of the tissue to be stored. In some embodiments, netting or other restraints may be used to retain the sample on the cushioned support surface. Basins may include a lid to help maintain a desired temperature and reduce contamination. The inner surface of the basin may be contoured not just for generic profiles of different organs but also subcategories based on the size, age, and/or gender of the donor to ensure a close fit.

It is additionally beneficial for the base and/or basin to be made of a material that can be sterilized by steam (autoclave) or with UV irradiation, or another form of sterilization. Sterilization will prevent tissues from becoming infected with viruses, bacteria, etc., during storage.

A variety of preservation solutions can be used with the examples disclosed herein. This includes approved preservation solutions, such as Histidine-Tryptophan-Ketoglutarate (HTK) (e.g., HTK Custodial™) and Celsior™ solutions for the preservation of hearts and cardiac tissues, and University of Wisconsin Solution (Viaspan™) and MPS-1 for the preservation of kidney and kidney tissues. Other preservation solutions, including non-approved solutions, and off-label applications of approved solutions can be used with the devices disclosed herein. Preservation solutions can include Collins, EuroCollins, phosphate buffered sucrose (PBS), University of Wisconsin (UW) (e.g., Belzer Machine Preservation Solution (MPS)), histidine-tryptophan-ketoglutarate (HTK), hypertonic citrate, hydroxyethyl starch, and Celsior™. Additional details of these solutions can be found at t'Hart et al. "New Solutions in Organ Preservation," *Transplantation Reviews* 2006, vol. 16, pp. 131-141 (2006), which is incorporated by reference in its entirety.

Temperature sensors may be any temperature reading device that can be sterilized and maintained in cold environment, i.e., the environment within the basin during storage of tissue. The temperature sensor may be a thermocouple, thermistor, infrared thermometer, or liquid crystal thermometer. A temperature display may be coupled to the temperature sensor using any suitable method, for example a wire, cable, connector, or wirelessly using available wireless protocols.

In addition to the temperature sensor, systems disclosed herein may include one or more temperature displays. A temperature display can be any display suitable for displaying a temperature measured by the temperature sensor, or otherwise providing information about the temperature within the static self-purging preservation apparatus. For example, the temperature display can be a light emitting diode (LED) display or liquid crystal display (LCD) showing digits corresponding to a measured temperature. The display may alternatively comprise one or more indicator lights, for example an LED which turns on or off or flashes to indicated whether the temperature measured by the temperature sensor is within an acceptable range, e.g., 2-10° C., e.g., 4-6° C., e.g., about 4° C. The temperature sensor may also be connected to a processor (not shown) which will compare the measured temperature to a threshold or range and create an alert signal when the temperature exceeds the threshold or range. The alert may comprise an audible tone, or may signal to a networked device, e.g., a computer, cell phone, or pager that the temperature within the basin exceeds the desired threshold or range. The basin may comprise an insulating material that is effective in maintaining the temperature inside the insulated basin. A suitable insulating material may be any of a number of rigid polymer foams with high R values, such as polystyrene foams (e.g. STYROFOAM™), polyurethane foams, polyvinyl chloride foams, poly(acrylonitrile)(butadiene)(styrene) foams, or polyisocyanurate foams. Other materials, such as spun fiberglass, cellulose, or vermiculite could also be used. Typically, the insulating vessel will be constructed to provide a close fit for the desired contents (e.g., cooling material/systems, support surface, and organ or other biological sample), thereby affording additional mechanical protection to the tissues contained therein. In some embodiments, the insulated basin may be constructed of a closed-cell foam that will prevent absorption of liquids, for example water, body fluids, preservation fluid, saline, etc. In some embodiments, the insulated basin may include a water-resistant lining to facilitate cleaning the insulated basin after use. In some embodiments, the lining will be removable and disposable. The insulated basin may have a hard shell on the exterior to protect the insulating material from damage or puncture. The hard shell may be formed of metal (e.g. aluminum or steel) or of a durable rigid plastic (e.g. PVC or ABS). The hard shell may have antibacterial properties through the use of antibacterial coatings or by incorporation of metal that have innate antibacterial properties (e.g. silver or copper).

The basin may have a lid connected thereto with a hinge, hasp, clasp, or other suitable connector. The basin lid may also close with a press-fit. The insulated basin may include an insulating seal to make to make an air- or water-tight coupling between the basin and lid. However, the insulated lid need not be sealed to the basin for the insulated basin to maintain a suitable temperature during storage. In some embodiments, the basin and lid will be coupled with a combination lock or a tamper-evident device. The basin may additionally comprise a handle or a hand-hold or facilitate moving the insulated basin when loaded.

The system may use any of a number of active or passive cooling media to maintain the temperature inside the insulated basin during storage. The cooling media may comprise eutectic cooling blocks, which have been engineered to have a stable temperature between 2-10° C., for example. The cooling media may be arranged in recesses in the base or basin. The recesses may be a slot or pockets/shelves formed above and under trays or support surfaces as shown in FIGS. 2 and 3. In certain embodiments, recesses may be a press-fit, or the cooling media may be coupled to the walls, floor, or lid of the basin using a snap, screw, hook and loop, or another suitable connecter. Eutectic cooling media suitable for use with suitable embodiments disclosed herein are available from TCP Reliable Inc. Edison, NJ 08837, as well as other suppliers. Other media, such as containerized water, containerized water-alcohol mixtures, or containerized water-glycol mixtures may also be used. The basin need not be rigid, for example the cooling media may be contained in a bag which is placed in the recess. Using the cooling media, e.g. eutectic cooling blocks, embodiments disclosed herein are capable of maintaining the temperature of the sample in the range of 2-10° C. for at least 60 minutes, e.g., for greater than 4 hours, for greater than 8 hours, for greater than 12 hours, or for greater than 16 hours.

In various embodiments, cooling blocks may include eutectic cooling media or other phase change material (PCM) such as savENRG packs with PCM-HS01P material commercially available from RGEES, LLC or Akuratemp, LLC (Arden, NC). Exemplary PCM specifications including a freezing temperature of 0° C.+/−0.5° C., a melting temperature of 1° C.+/−0.75° C., latent heat of 310 J/g+/−10 J/g, and density of 0.95 gram/ml+/−0.05 gram/ml. Pouch dimensions may vary depending on application specifics such as tissue to be stored and the internal dimensions of the basin and external dimensions of the tissue storage device, chamber, or canister. PCM may be included in pouches approximately 10 inches by 6 inches having approximately 230 g of PCM therein. Pouches may be approximately 8.5 mm thick and weigh about 235 g to 247 g. In some embodiments, pouches may be approximately 6.25 inches by 7.75 inches with a thickness of less than about 8.5 mm and a weight of between about 193 g and about 201 g. Other exemplary dimensions may include about 6.25 inches by about 10 inches. Pouches may be stacked or layered, for example in groups of 3 or 4 to increase the total thickness and amount of PCM. In certain embodiments, PCM containing pouches may be joined side to side to form a band of coupled PCM pouches. Such a band may be readily manipulated to wrap around the circumference of a cylindrical storage basin and may have dimensions of about 6 inches by about 26 inches consisting of approximately 8 individual pouches joined together in the band.

Figure 6:
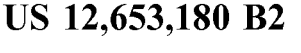
FIG. 6 shows an exemplary thermoelectric cooler.
Figure 7:
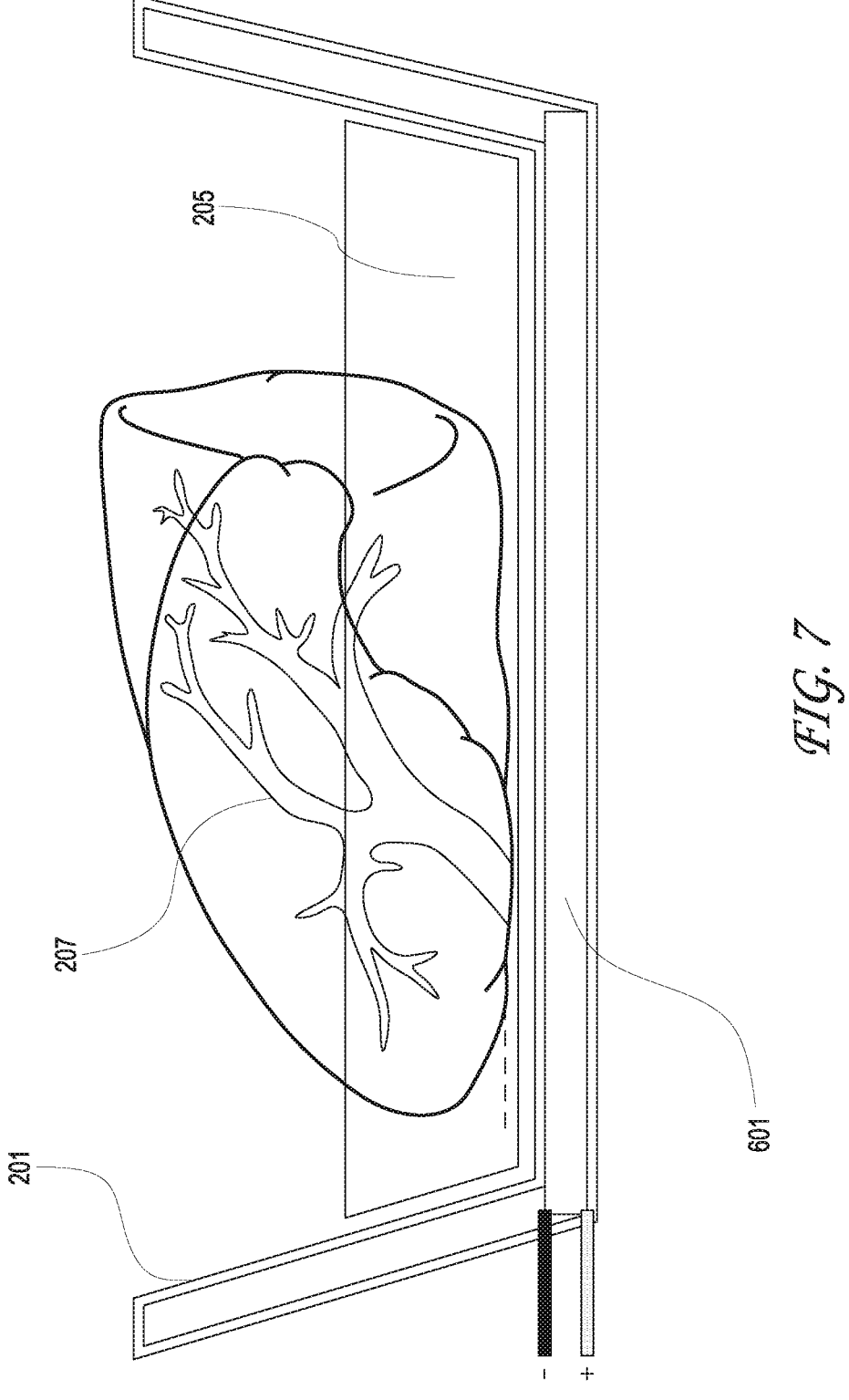
FIG. 7 shows an example of a basin having an integrated thermoelectric cooler.
Figure 8:
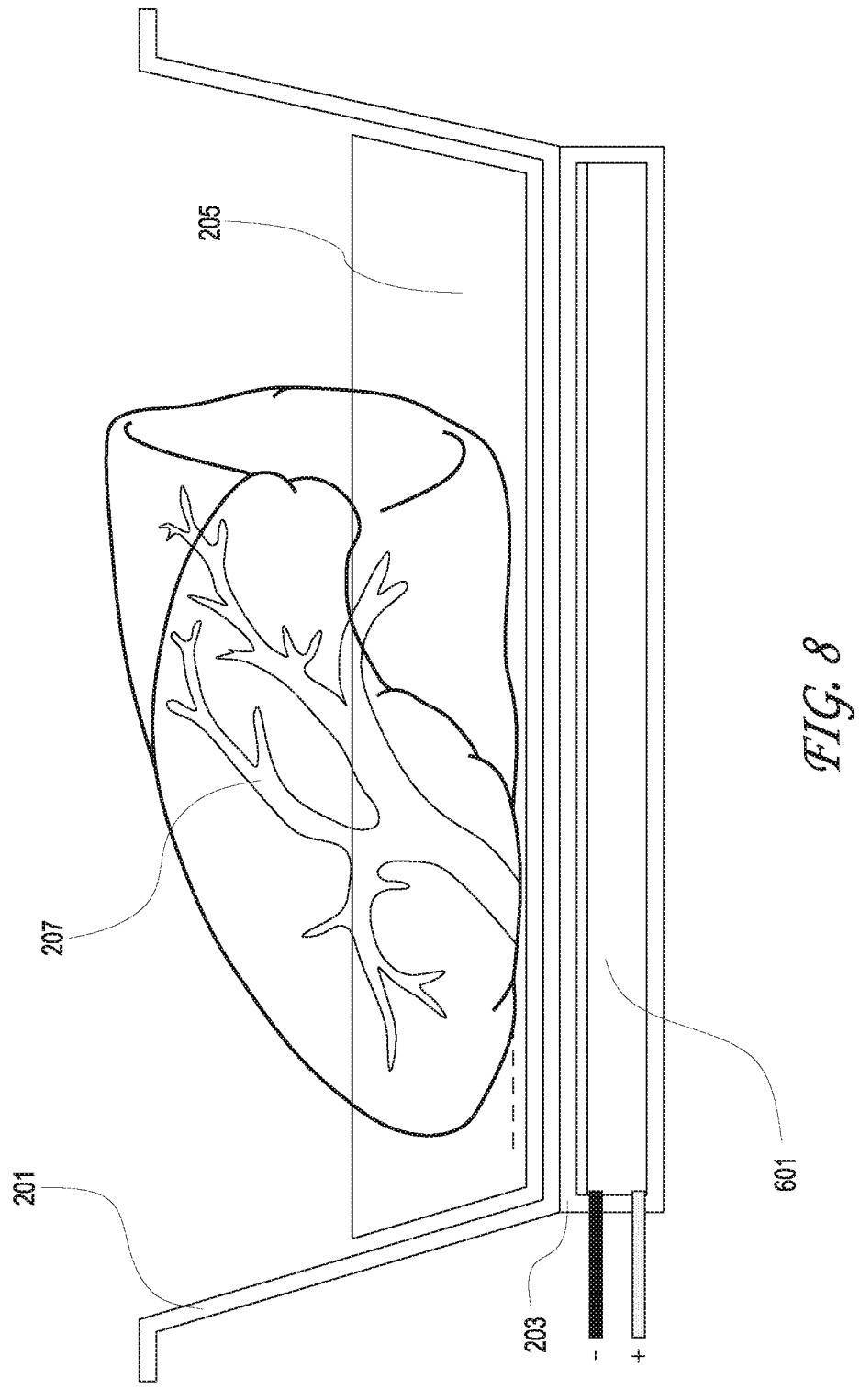
FIG. 8 shows an example of a basin positioned over a base having an integrated thermoelectric cooler.

In certain embodiments, the cooling media integrated in the base 203 or basin 201 or inserted into a recess or cavity therein may comprise a thermoelectric cooling device 601 such as a Peltier cooler as illustrated in FIG. 6 using the Peltier effect to create a heat flux at the junction of two different types of materials. In some embodiments the cooling media may include a vapor-compression or refrigerant-based system for cooling. FIG. 7 illustrates an example of a thermoelectric cooling device 601 integrated into the basin 201 itself while FIG. 8 shows an example of a thermoelectric cooling device 601 integrated into a supportive base 203.

The basin and portions of the support surface may be constructed from or covered in a sterilizable material, i.e., made of a material that can be sterilized by steam (autoclave) or with UV irradiation, or another form of sterilization. Sterilization will prevent tissues from becoming infected with viruses, bacteria, etc., during storage. In a typical embodiment the sterile canister will be delivered in a sterile condition and sealed in sterile packaging. In some embodiments, the sterile canister apparatus will be re-sterilized prior to reuse, for example at a hospital. In other embodiments, the sterile canister will be disposable.

Thus, using the system for hypothermic storage of tissues of the embodiments disclosed herein, it is possible to store a biological sample (e.g. tissue, organs, or body fluids) over distances while maintaining a temperature of 2-10° C. Systems disclosed herein will enable medical professionals to keep tissues (e.g. organs) in a favorable hypothermic environment for extended periods of time, thereby allowing more time between harvest and transplant. As a result of the embodiments disclosed herein, a greater number of donor organs will be available thereby saving lives.

Figure 9:
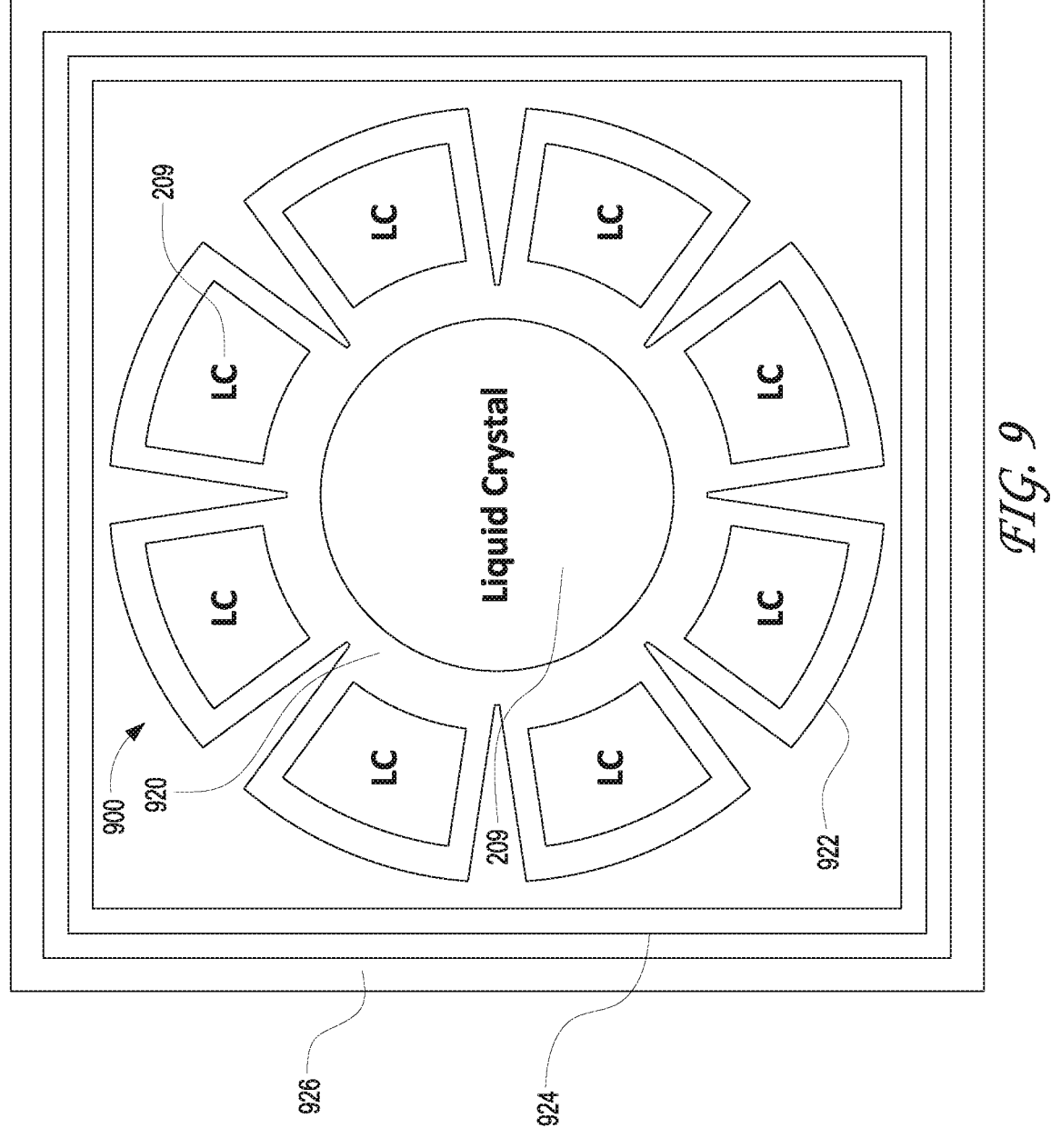
FIG. 9 shows an example of a packet containing cooling media in two bags.

FIG. 9 shows an embodiment of a packet 900 containing cooling media 209 in two bags. In certain embodiments, the packet 900 can include a central packet 920 containing cooling media 209 and petals 922 containing cooling media 209. The cooling media 209 can be liquid crystal or any suitable medium disclosed herein such as ice or phase change materials such as described elsewhere herein. The central packet 920 can be integral with the petals 922 or separate from the petals 922. In certain embodiments, some of the petals are integral while others are The packet 900 can include fold lines between the inner packet 920 and petals 922. The fold lines can indicate where the packet is supposed to fold. The packet 900 can be sealed within an inner bag 924 and an outer bag 926. The packet 900 can be positioned between an inner bowl and an outer bowl. The inner bowl can be configured to receive an organ. The inner bag 924 may be removable. The outer bag 926 may be removable. Bags may be removed for shipping and sterilization. The packet 900 may be stiff and rigid when frozen. The spaces between the petals 922 may provide a means to bend and fold the flat packet 900 to contour to a bowl configuration.

In certain embodiments, the packet 900 can be heat sealed with the cooling media 209 inside. The packet 900 can be pre-loaded with the cooling media 209. Folding the packet 900 along the fold lines can allow rigid liquid crystal to conform to the bow. Folding the packet 900 along the fold lines can minimize storage space. Folding the packet 900 along the fold lines can minimize freezer space. In some embodiments, the cooling media 209 is liquid crystal beads. Using liquid crystal beads can allow the packet 900 to maintain a flat, rolled, or folded assembly. Advantageously, the cooling media 209 can be fully contained by the packet 900. The packet 900 can be substituted for another packet without substituting the bowls if a longer time period is required. The packet 900 can be frozen in a horizontal plane to prevent packet bulging. The packet 900 can be bowl size dependent. In some embodiments, the cooling media 209 is a cooling element.

Figure 10A:
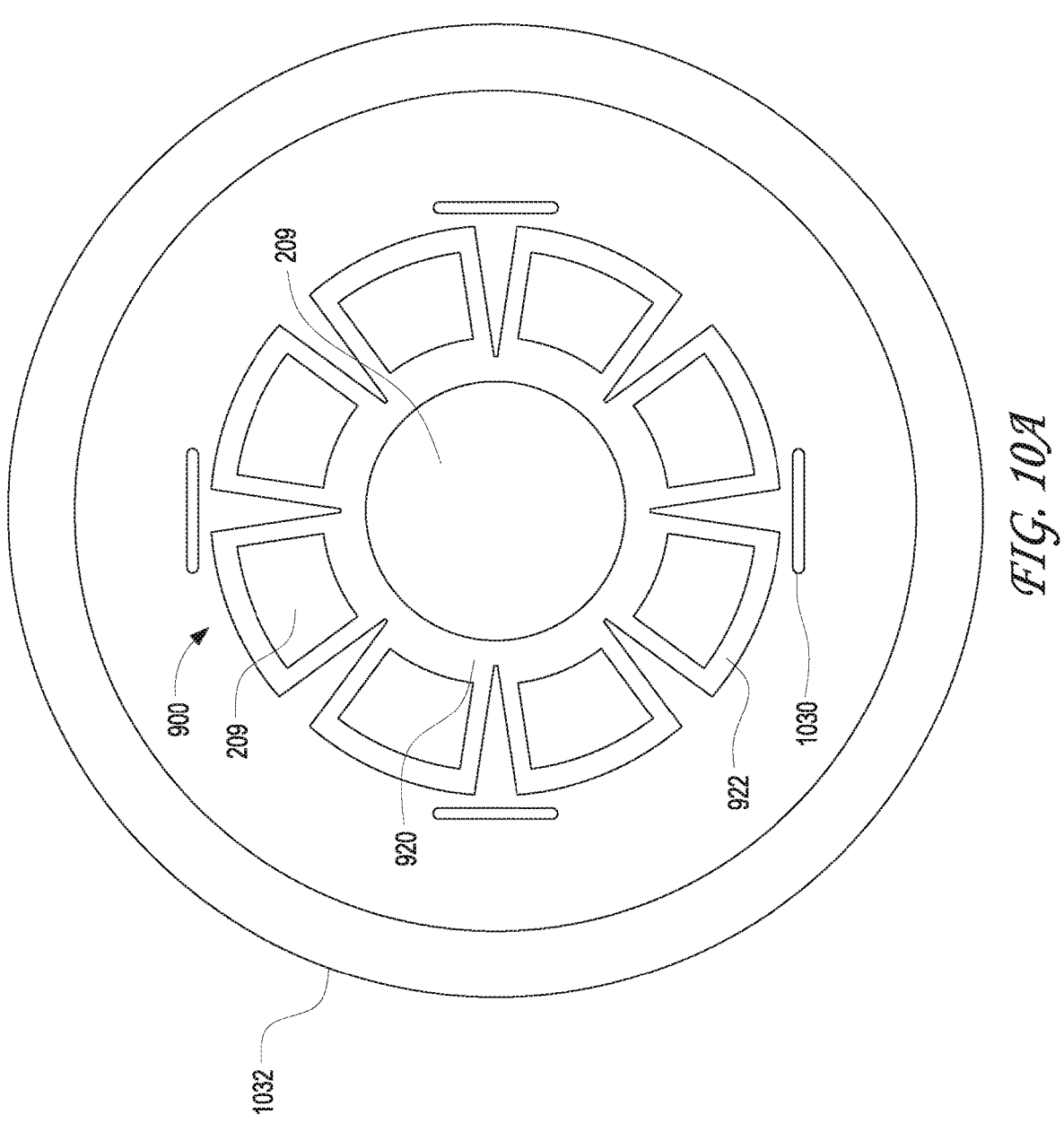
FIG. 10A shows a top view of an example of a packet of cooling media inside a pouch.
Figures 10B, 10C:
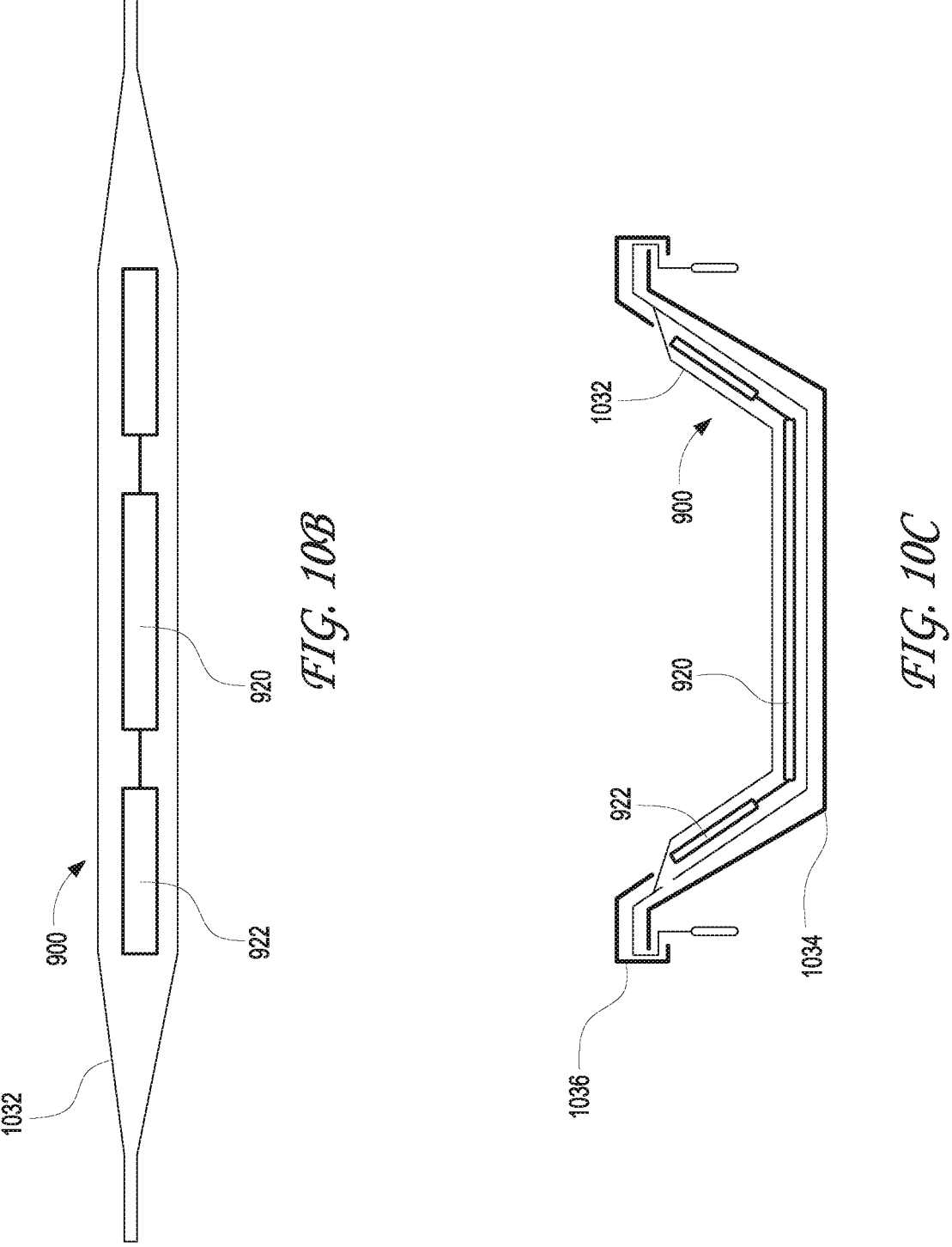
FIG. 10B shows a side view of an example of the packet of cooling media inside a pouch.
FIG. 10C shows a side view of an example of the packet of cooling media inside a pouch positioned in a bowl.

FIG. 10A shows a top view of an embodiment of a packet 900 inside a pouch 1032. FIG. 10B shows a side view of the packet 900 inside a pouch 1032. FIG. 10C shows a side view of the packet 900 inside a pouch 1032 positioned in a bowl 1034. The packet 900 can be similar to the packet 900 of FIG. 9. The packet 900 can be sealed in a pouch 1032. The pouch 1032 can be a heat sealed pouch. The pouch 1032 can be an organ contact pouch. The pouch 1032 can have locator heat seals 1030. The packet 900 can be surrounded by the locator heat seals 1030. The locator heat seals 1030 can be used for packet location. The pouch 1032 can provide an organ contact surface. The pouch 1032 can be retained in the bowl 1034 or an outer pouch.

In some embodiments, the pouch 1032 can be radio frequency welded. The packet 900 and pouch 1032 can be positioned in a bowl 1034. The packet 900 and pouch 1032 can at least partially conform to the shape of the bowl 1034. The pouch 1032 can be sealed to the bowl 1034 at edges of the bowl 1034 using snap rings 1036. The snap rings 1036 can be 360 degree bowl rim snap rings. The snap rings 1036 can be bowl rim clips. The pouch 1032 containing the packet 900 can be a self-contained system. The snap rings 1036 can be customized based on the bowl 1034. The pouch 1032 can be welded using a large heat seal die.

Figure 11A:
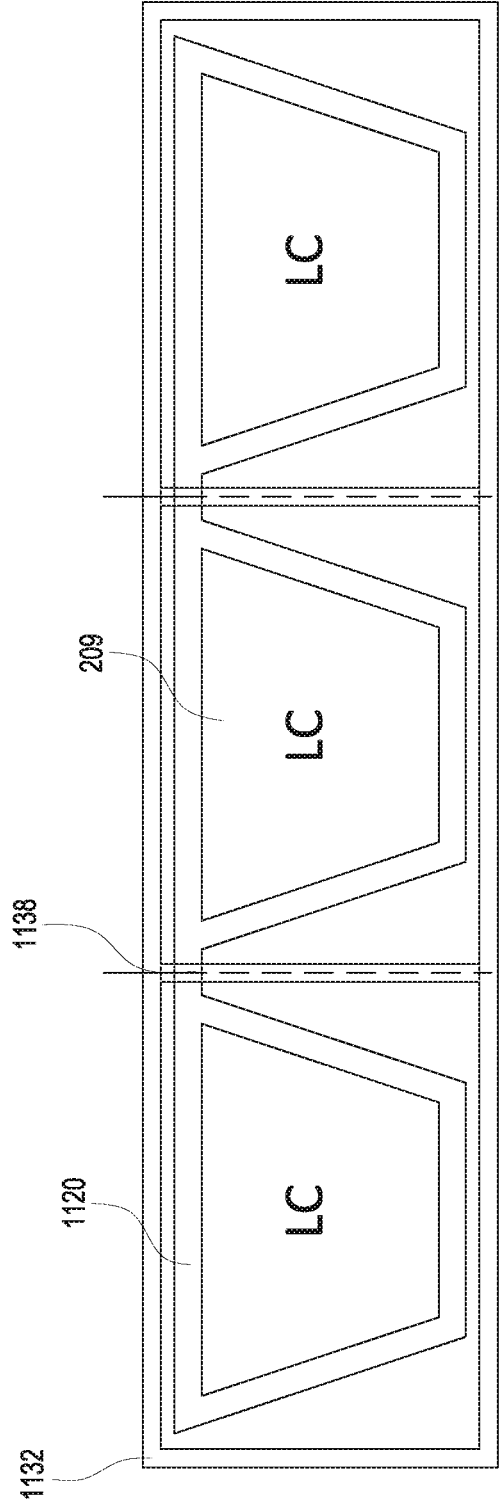
FIG. 11A shows a side view of an example of packets inside a pouch.

FIG. 11A shows a side view of an embodiment of packets 1120 inside a pouch 1132. The packets 1120 can be filled with cooling media 209. The pouch 1132 can contain multiple packets 1120. The pouch 1132 can be separated by pouch walls 1138. The pouch walls 1138 can have perforations. The pouch 1132 can be separated at the pouch walls 1138 to accommodate different bowl diameters. The packets 1120 can be a string of packets. The packets 1120 can be connected through the pouch walls 1138. The packets 1120 can be bowl wall packets 1120. The packets 1120 can stand against a bowl side wall. The packets 1120 can be pre-packaged and sterile.

Figure 11B:
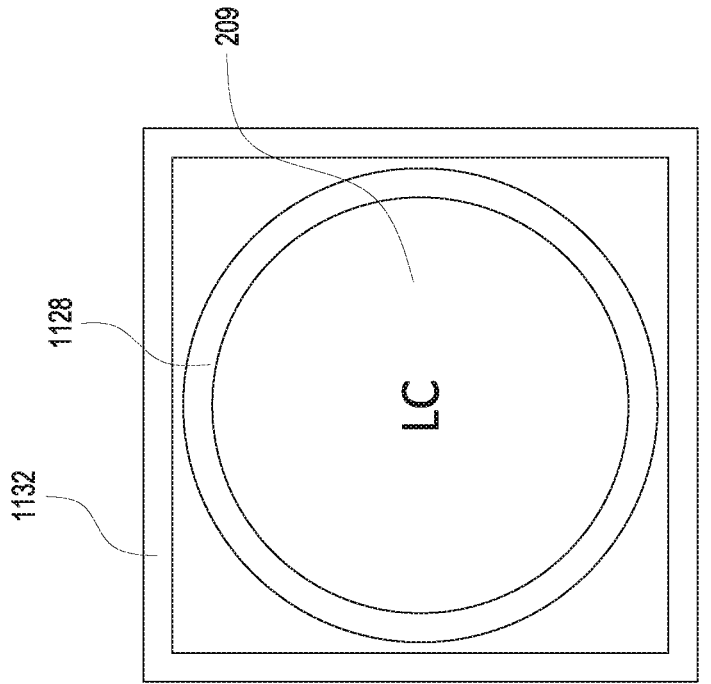
FIG. 11B shows a top view of an example of a packet inside a pouch.

FIG. 11B shows a top view of an example of a packet 1128 inside a pouch 1132. The packet 1128 can be a bowl bottom packet. The packet 1120 can be positioned inside the bottom of a bowl. The packet 1128 can be part of the string of packets 1120. The packet 1128 can be separate from the string of packets 1120. The packets 1128 can be pre-packaged and sterile.

Figure 12:
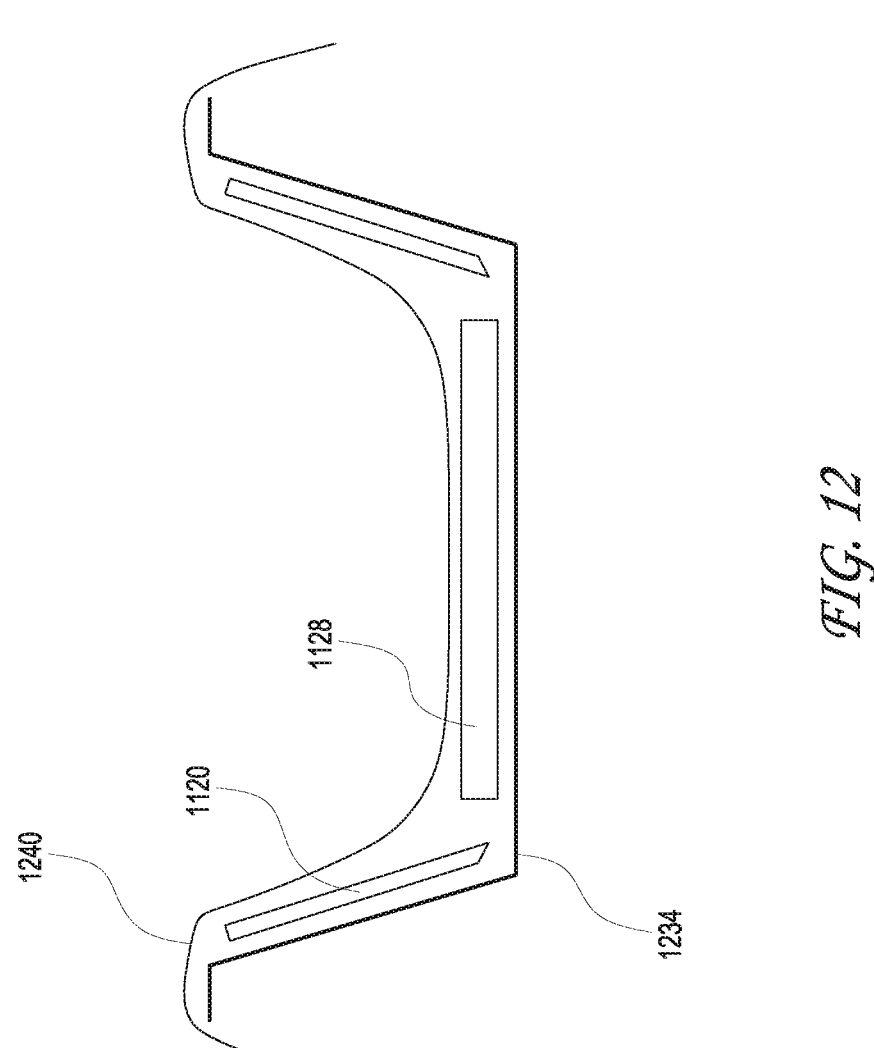
FIG. 12 shows a side view of an example of packets inside a bowl with a drape.

FIG. 12 shows a side view of an example of packets 1120, 1128 inside a bowl 1234 with a drape 1240. The drape 1240 can substitute for the pouches of earlier Figures. The bowl bottom packet 1128 can be positioned at the bottom of the bowl 1234. The bowl wall packets 1120 can be positioned along the side walls of the bowl 1234. The drape 1240 can cover the packets 1120, 1128. The drape 1240 can extend over the walls of the bowl 1234. The drape 1240 can be a polybag draped over the bowl 1234. The drape 1240 can be connected to the bowl with rim clips. In some embodiments, the drape 1240 is not connected to the bowl with rim clips. The drape 1240 can be an organ interface. The drape 1240 can be interchanged with an upper bowl. The drape 1240 can be interchanged with a thermoformed upper bowl. The bowl 1234 can be a thermoformed lower bowl.

Figure 13:
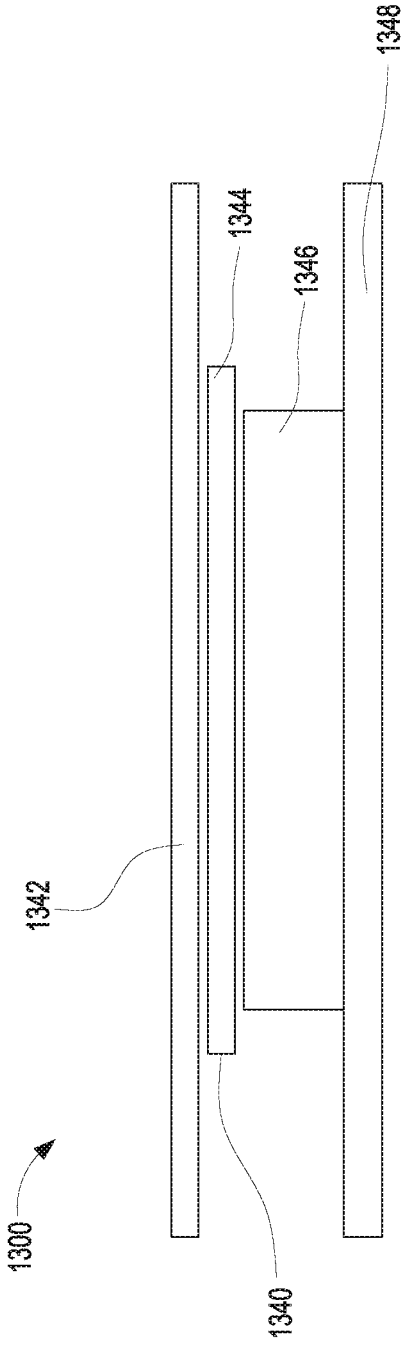
FIG. 13 shows an example of a polybag assembly.

FIG. 13 shows an embodiment of a polybag assembly 1300. A first polybag side 1342 can be clear. The first polybag side 1342 can contact an organ. A label 1344 can be positioned inside the polybag assembly 1300. The label 1344 can face upward. The label 1344 can be surrounded by adhesive 1340. The label 1344 can be double-backed with adhesive 1340. The adhesive 1340 can contact the first polybag side 1342 and a liquid crystal packet 1346. In some embodiments, the logo can contact a second polybag side 1348 instead of the first polybag side 1342. The adhesive 1340 contacting the liquid crystal packet 1346 can be strong adhesive. The liquid crystal packet 1346 can be positioned inside the polybag assembly 1300. The second polybag side 1348 can contact the liquid crystal packet 1346. The liquid crystal packet 1346 can be shaped packets or packets with microbead liquid crystal material. The label 1344 can hide packet adhesion to the polybag. The polybag assembly 1300 can be vacuum sealed. Vacuum sealing the polybag assembly 1300 can create enough tension on the bag to hold the contents flat during freezing. The label 1344 may provide pertinent information. The label 1344 may be readable to the user. The label 1344 may be on the backside of the organ contact film to avoid compromising the organ integrity.

Figures 14, 15, 16, 17:
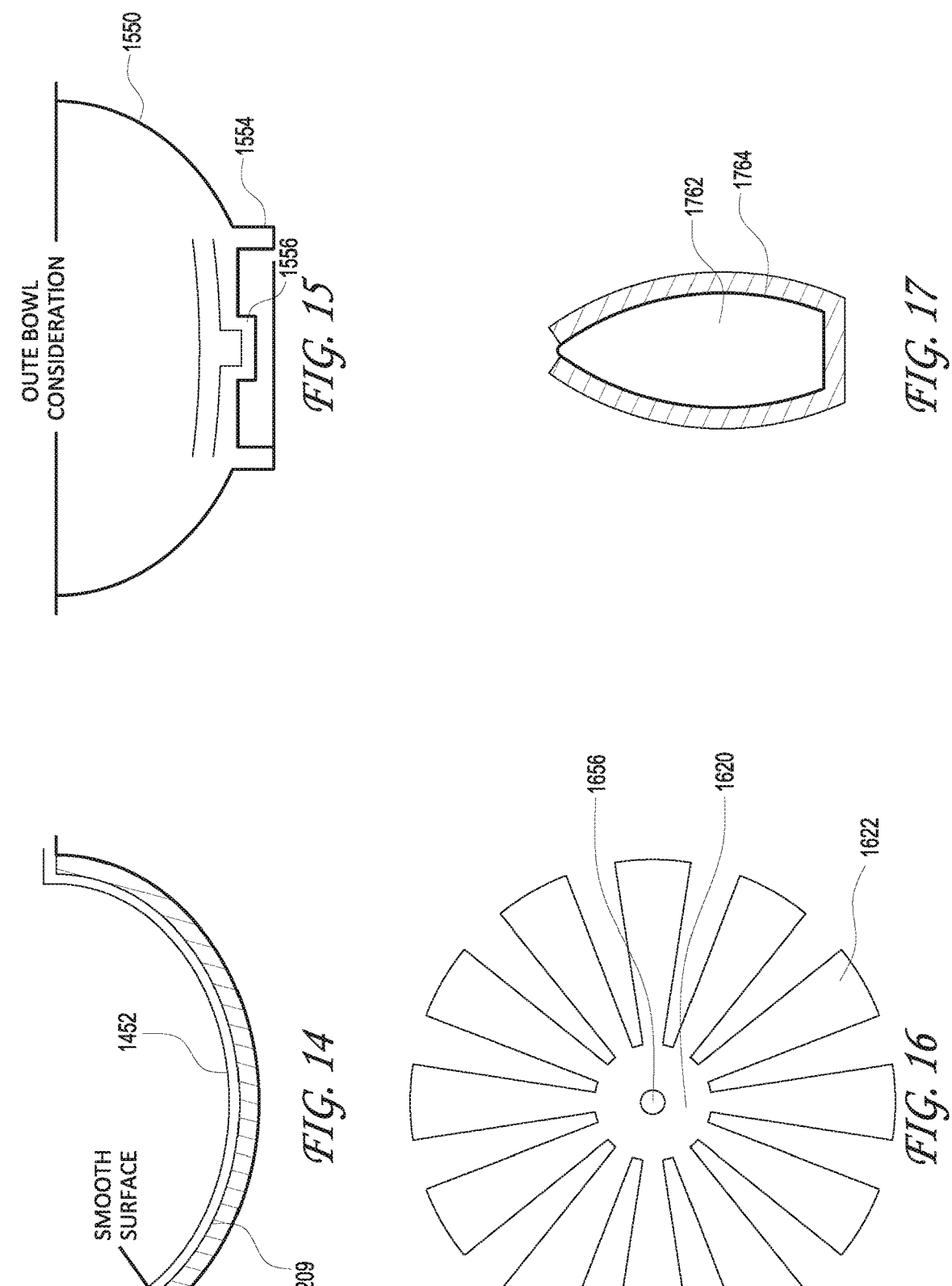
FIG. 14 shows an example of a thermoformed bowl with cooling media inside.
FIG. 15 shows an example of an outer bowl.
FIG. 16 shows an example of a flat state, die cut packet of cooling media.
FIG. 17 shows an example of a cooling media pouch packaged for freezing.

FIG. 14 shows an example of a thermoformed bowl with cooling media 209 inside. The thermoformed bowl can include an outer bowl 1450 and an inner bowl 1452. The inner bowl 1452 can contact an organ. A slot between the outer bowl 1450 and inner bowl 1452 can allow the cooling media 209 to be added and removed from the bowl. In some embodiments, the bowls do not have a slot. The inner bowl 1452 can be stainless steel. A stainless steel inner bowl 1452 can be hermetically bonded to a thermoformed outer bowl 1450.

FIG. 15 shows an example of an outer bowl 1550. The outer bowl 1550 can have a stabilizer ring 1554 for keeping the outer bowl 1550 upright. The outer bowl 1550 can have a cooling media fill port 1556. The cooling media fill port 1556 can allow the cooling media to be added and removed from the outer bowl.

FIG. 16 shows an example of a flat state, die cut packet of cooling media. The packet can have a central packet 1620 filled with cooling media. The central packet 1620 can be positioned at the bottom of a bowl. The packet can have petals 1622 filled with cooling media. The petals 1622 can be positioned along the inner walls of the bowl. The packet can have a fill port 1656. The fill port 1656 can be used to fill the packet with cooling media and remove cooling media from the packet. The cooling media can be liquid crystal. The petals 1622 can contact other petals 1622 when the packet is placed in a bowl.

FIG. 17 shows an example of a cooling media pouch packaged for freezing. The internal thermoform structure 1762 can maintain petal curvature when frozen hard. The internal thermoform structure 1762 can be surrounded by an outside support 1764. The outside support 1764 can be a thermoform. The outside support 1764 can be a shrink band. The outside support 1764 can be a pouch. The internal thermoform structure 1762 can be a low profile storage package.

Figure 18:
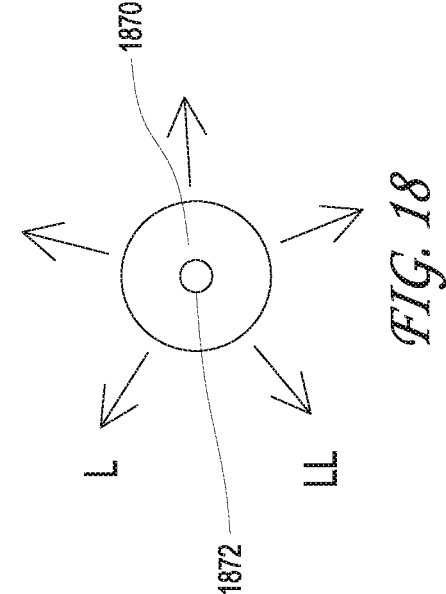
FIG. 18 shows an example of an expansion pouch.

FIG. 18 shows an example of an expansion pouch 1870. The expansion pouch 1870 can expand when filled with cooling media. The expansion pouch 1870 can expand when frozen. The center 1872 of the expansion pouch 1870 can be unfilled to account for expansion during freezing.

Figure 19:
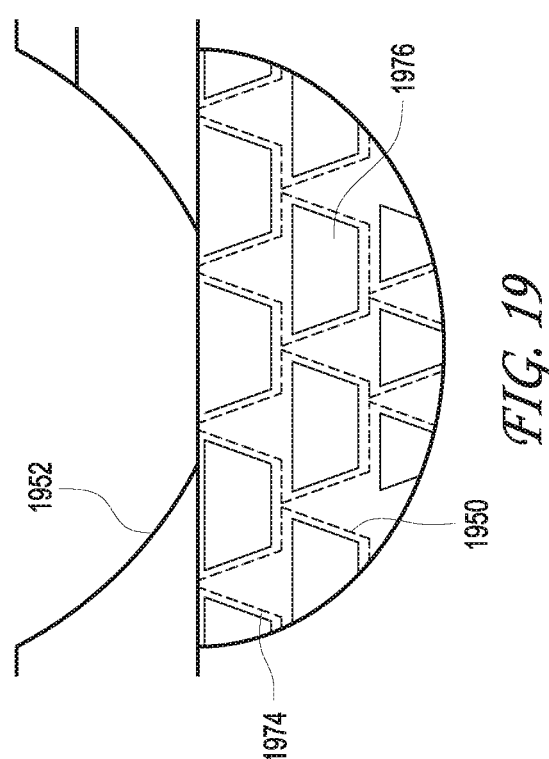
FIG. 19 shows an example of an inner thermoform bowl and an outer thermoform bowl with pockets containing packets of cooling media.

FIG. 19 shows an example of an inner thermoform bowl 1952 and an outer thermoform bowl 1950 with pockets 1974 containing packets 1976 of cooling media. The inner thermoform bowl 1952 can fit inside the outer thermoform bowl 1950. The inner thermoform bowl 1952 can contact an organ. The outer thermoform bowl 1950 can have pockets 1974. The pockets 1974 can contain packets 1976 of cooling media. The cooling media can be added to and removed from the pockets 1974.

Figure 20:
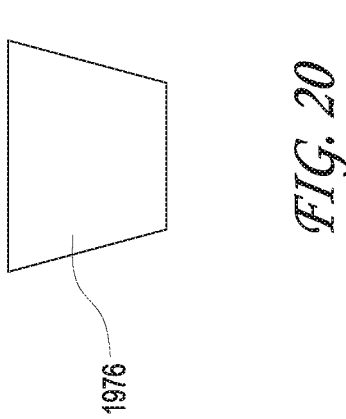
FIG. 20 shows an example of a packet of cooling media.

FIG. 20 shows an example of a packet 1976 of cooling media. The packet 1976 can be shaped to fit in a pocket. The packet 1976 can be positioned in a recessed pocket. Packets 1976 may be sized to placement in a pocket. Packets 1976 may match the size of the pocket.

Figure 21A:
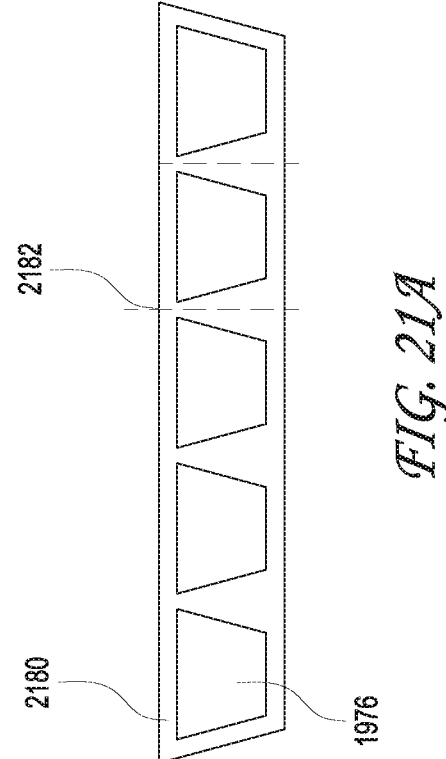
FIG. 21A shows an example of packets of cooling media in a pouch with flex areas in a flat position.

FIG. 21A shows an example of packets 1976 of cooling media in a pouch 2180 with flex areas 2182 in a flat position. FIG. 21B shows an example packets 1976 of cooling media in a pouch 2180 with flex areas 2182 in a curved position. The pouch 2180 can contain multiple packets 1976 of cooling media. The pouch 2180 can flex at flex areas 2182. The pouch 2180 can be frozen in a flat position. The pouch 2180 can be positioned in a curved or circular position to wrap around a bowl. Multiple pouches 2180 may be used to surround a bowl. One, two, three, four, or more than four pouches 2180 may be used to surround a bowl. The pouches 2180 may be sized based upon position on or inside a bowl. The packets 1976 may have size-minimized straight segments to position against a radius of a bowl.

FIG. 22 shows a packet 1976' of cooling media with example dimensions. The packet 1976' can have a width of ¼ the diameter of the bowl. The packet 1976' can have a width of between ⅛ and ½ the diameter of the bowl or more. The packet 1976' can have a height of the bowl radius length. The packet 1976' can contain liquid crystal beads.

FIG. 23A shows an example of a cooling media packet made up of circular packets 2382 in a curved position. FIG. 23B shows a cooling media packet made up of circular packets 2382 in a flat position. The circular packet 2382 can have a diameter such that the circular packets 2382 touch when placed in a bowl. The circular packets 2382 can be connected at a bottom layer 2384. The packet can be frozen in the flat position.

In some embodiments, packets can stay flexible when frozen. In some embodiments, an IV-like bag can be filled with cooling media beads. In some embodiments, a fill area between double layer walls can be filled with cooling media through a luer lock or similar filling port. In some embodiments, petals can be filled with liquid crystal beads.

Figures 24, 25, 26, 27:
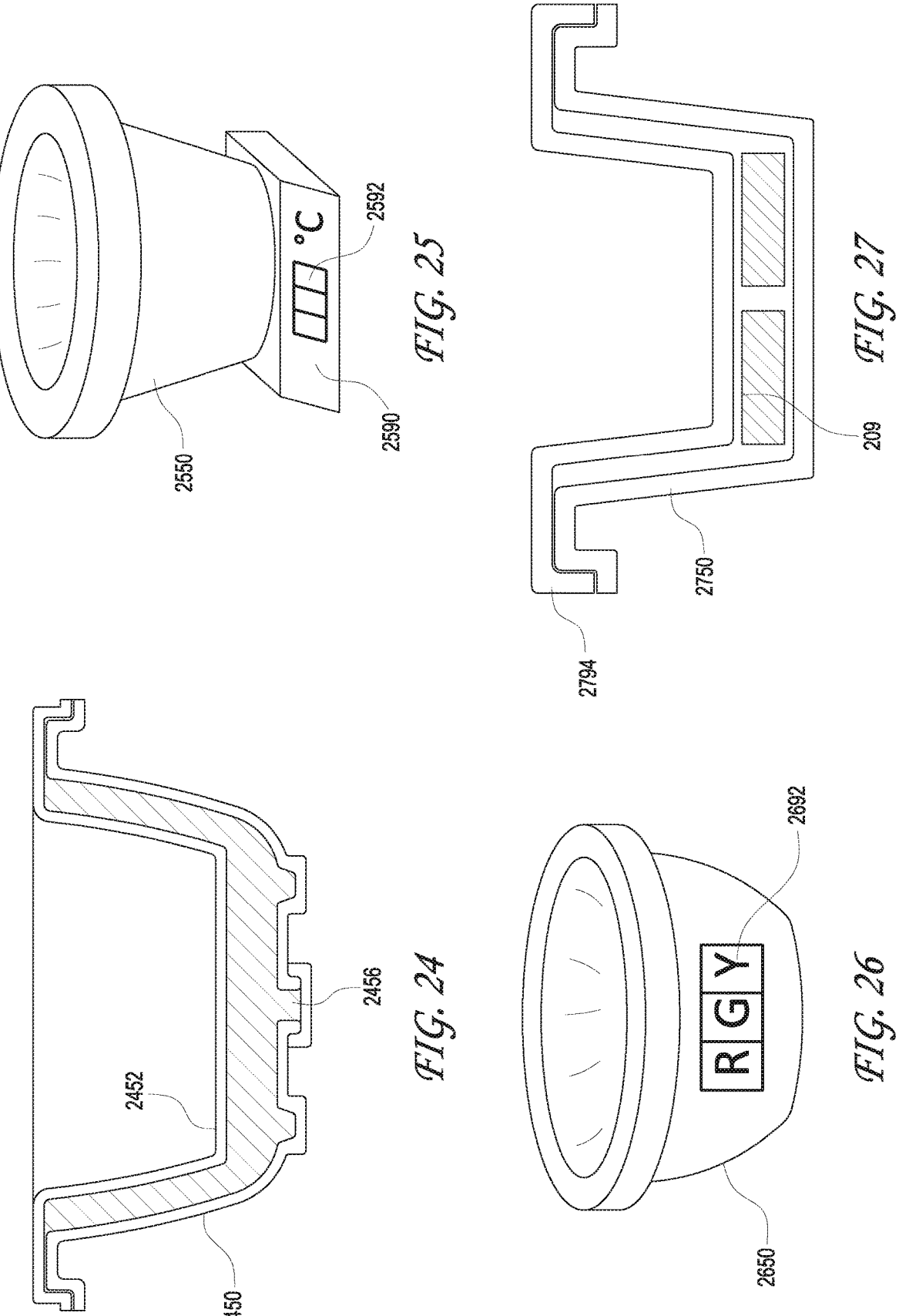
FIG. 24 shows an example of a twin sheet thermoform bowl.
FIG. 25 shows an example of a bowl positioned on a base with a digital display.
FIG. 26 shows an example of a bowl with a color display.
FIG. 27 shows an example of an outer bowl with a slip fit and cooling media.

FIG. 24 shows an example of a twin sheet thermoform bowl. The inner bowl 2452 and outer bowl 2450 can be thermoformed simultaneously. The bowl size can be organ dependent. The shape of the inner bowl 2452 can be organ dependent. A cavity between the inner bowl 2452 and outer bowl 2450 can be filled with cooling media, such as liquid crystal and/or any suitable medium disclosed herein. Cooling media can be inserted in a quantity that allows expansion of volume during freezing. A fill port 2456 can allow cooling media to be inserted and removed. The fill port 2456 can have a cap. The cap can be a solvent, spin, screw, or weld. The bowl can have one port, two ports, or more than two ports. Ports can be used for air ventilation during filling. The inner bowl 2452 can contain an organ.

FIG. 25 shows an example of a bowl 2550 positioned on a base 2590 with a digital display 2592. The base 2590 can include a battery pack. The bowl 2550 can include a temperature probe in the cooling media. The cooling media can be liquid crystal. The base 2590 can include a peltier cooler. The digital display 2592 can display temperature of the cooling media. The bowl 2550 can contain an organ.

FIG. 26 shows an example of a bowl 2650 with a color display 2692. The bowl 2650 can contain an organ. The color display 2692 can be a liquid crystal label. The color display 2692 can change color depending on the internal temperature of the bowl 2650. The color display 2692 can change color depending on the external temperature of the bowl 2650. The color display 2692 can display red when under 4 degrees Celsius. The color display 2692 can display green when between 4 and 8 degrees Celsius. The color display 2692 can display yellow when above 8 degrees Celsius. The display can display three colors, or another progressive color change indicator, for temperature indication to the user.

In some embodiments, two single thermoforms can be welded together. In some embodiments, two single thermoforms can be welded together using radio frequency welding.

FIG. 27 shows an example of an outer bowl 2750 with a slip fit 2794 and cooling media 209. The outer bowl 2750 can be a single thermoform. The slip fit 2794 can fit above the single thermoform and cover the cooling media 209.

Figures 28, 29, 30:
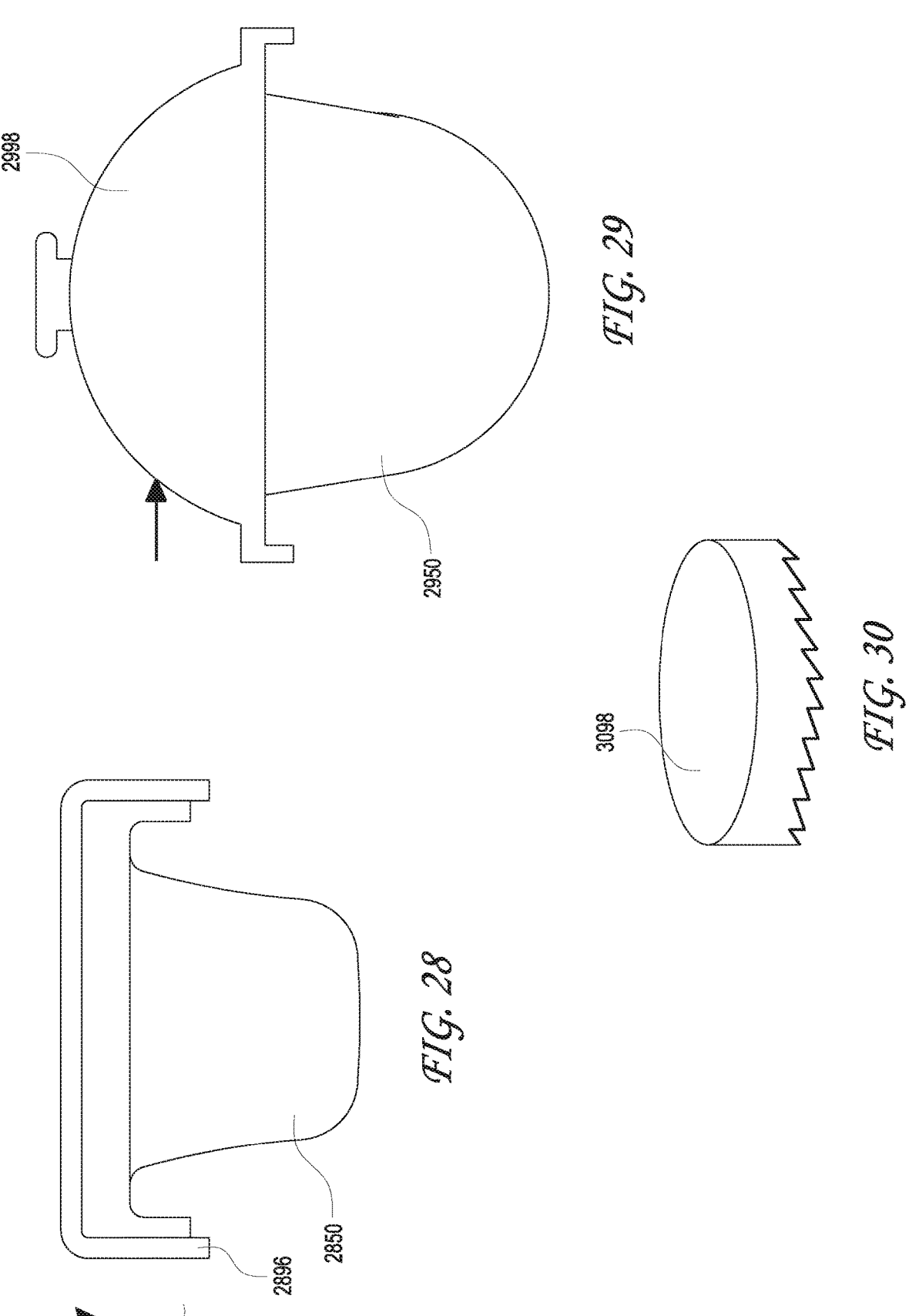
FIG. 28 shows an example of a bowl with a retractable handle.
FIG. 29 shows an example of a bowl with a cover.
FIG. 30 shows an example of an alternative cover for a bowl such as the bowl in FIG. 29.

FIG. 28 shows an example of a bowl 2850 with a retractable handle 2896. The bowl 2850 can contain an organ.

FIG. 29 shows an example of a bowl 2950 with a cover 2998. The cover 2998 can be removable. The cover 2998 is not necessarily removable. The bowl 2950 can contain an organ.

FIG. 30 shows an example of an alternative cover 3098 for a bowl such as the bowl in FIG. 29. The cover 3098 can be clear. The cover 3098 can be clastic.

In some embodiments, cooling media and bowls can be pre-cooled. In some embodiments, cooling media and bowls can be pre-cooled to 4 degrees Celsius. In some embodiments, an inner canister of an organ transporter can be interchangeable with the bowl.

Figures 31, 32, 33:
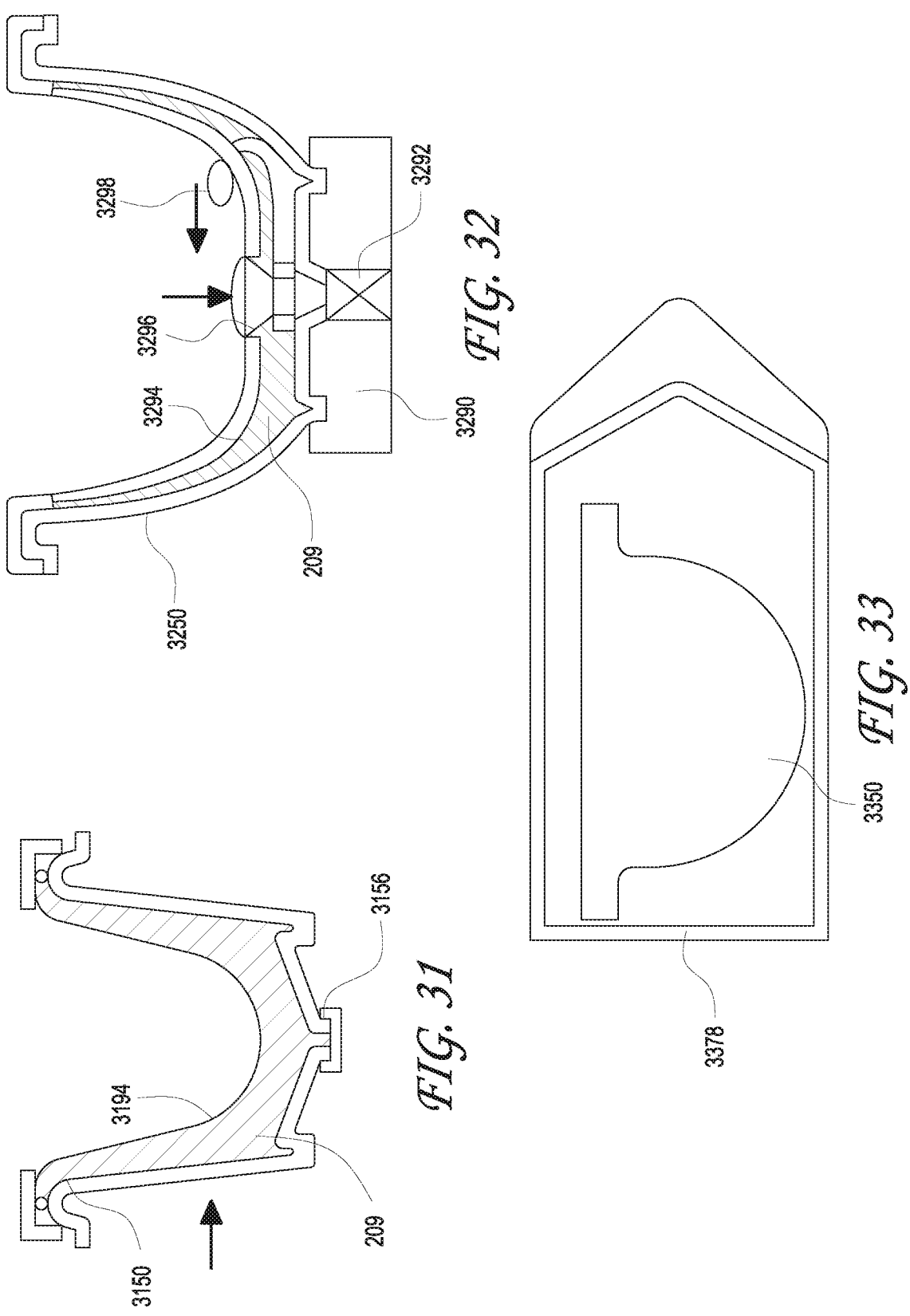
FIG. 31 shows an example of an outer bowl with an elastomeric cradle and cooling media.
FIG. 32 shows an example of a bowl with preservation circulation.
FIG. 33 shows an example of a bowl inside a sterile pouch.

FIG. 31 shows an example of an outer bowl 3150 with an elastomeric cradle 3194 and cooling media 209. The outer bowl 3150 can be a single thermoform. The elastomeric cradle 3194 can fit above the single thermoform and cover the cooling media 209. The elastomeric cradle 3194 can be flexible urethane, PVC, or liquid silicone. The elastomeric cradle 3194 can have an integrated O-ring seal. The cooling media 209 may not need thermal expansion space due to the elastomeric cradle 3194. A fill port 3156 can allow cooling media to be inserted and removed. The fill port 3156 can have a cap. The cap can be a solvent, spin, screw, or weld.

FIG. 32 shows an example of a bowl 3250 with preservation circulation. The base 3290 can have an centrifugal pump 3292. The centrifugal pump 3292 can be a centrifugal motor. Cooling media 209 can be positioned between the bowl 3250 and an elastomeric cradle 3294. An inflow port 3296 can have a screen or protection cap. Preservation fluid can flow in the inflow port 3296. A pump outlet 3298 can be anywhere inside the bowl wall. Preservation fluid can flow out of the pump outlet 3298.

FIG. 33 shows an example of a bowl 3350 inside a sterile pouch 3378. An organ can be positioned inside the bowl 3350 and inside the sterile pouch 3378.

Although various examples/embodiments have been described as having particular features and/or combinations of components, other embodiments are possible having any combination or sub-combination of any features and/or components from any of the embodiments described herein. One of skill in the art will understand that the words example and embodiment are used interchangeably herein. The specific configurations of the various components can also be varied. For example, the size and specific shape of the various components can be different than the embodiments shown, while still providing the functions as described herein. Thus, the breadth and scope of the invention should not be limited by any of the above-described embodiments. The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention.

Additional system and method of the invention are disclosed in the Examples below, which should not be viewed as limiting the invention in any way.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. An apparatus for storing a biological sample, comprising:
   a container configured to receive a biological sample;
   a central packet comprising cooling media, the central packet configured to be positioned at a bottom of an inside of the container, wherein the central packet has a substantially circular cross-section;
   a plurality of packets comprising cooling media, the plurality of packets disposed around a circumference of the central packet, wherein each packet of the plurality of packets is petal-shaped, wherein the plurality of packets are configured to be foldable with respect to the central packet, such that the plurality of packets are configured to be positioned along a wall of the inside of the container when the central packet is positioned at the bottom of the inside of the container;
   a pouch configured to contain the central packet and the plurality of packets; and
   a clip configured to secure an edge of the pouch to a rim of the container.

2. The apparatus of claim 1, wherein the central packet and the plurality of packets are contained in a bag.

3. The apparatus of claim 1, wherein the central packet and the plurality of packets are heat sealed in a bag.

4. The apparatus of claim 1, further comprising locator heat seals.

5. The apparatus of claim 2, further comprising a container snap ring configured to fix the plurality of packets to the container.

6. The apparatus of claim 1, further comprising a drape configured to cover the central packet and the plurality of packets.

7. The apparatus of claim 1, further comprising an inner bowl positioned above the central packet, wherein the container comprises an outer bowl.

8. The apparatus of claim 7, wherein the inner bowl and the outer bowl are thermoformed together.

9. The apparatus of claim 7, wherein the outer bowl comprises a fill port.

10. The apparatus of claim 7, wherein the outer bowl comprises a color display of temperature.

11. The apparatus of claim 1, further comprising a slip fit in the container configured to receive the biological sample, wherein the central packet is positioned between the container and the slip fit.

12. The apparatus of claim 11, wherein the slip fit is an elastomeric cradle.

13. The apparatus of claim 1, further comprising a centrifugal pump configured to circulate preservation solution around the biological sample.

14. The apparatus of claim 1, wherein a floor of the container comprises a cavity configured to receive the central packet.

15. An apparatus for storing a biological sample, comprising:
   a container configured to receive a biological sample;
   a central packet comprising cooling media, the central packet configured to be positioned at a bottom of an inside of the container;
   a plurality of packets comprising cooling media, the plurality of packets disposed around a periphery of the central packet,
   wherein the plurality of packets are configured to be foldable with respect to the central packet, such that the plurality of packets are configured to be positioned along a wall of the inside of the container when the central packet is positioned at the bottom of the inside of the container;
   a pouch configured to contain the central packet and the plurality of packets; and
   a clip configured to secure an edge of the pouch to a rim of the container.

16. The apparatus of claim 15, wherein the clip comprises a snap ring.

17. The apparatus of claim 15, further comprising a slip fit in the container configured to receive the biological sample, wherein the central packet is positioned between the container and the slip fit.

18. The apparatus of claim 17, wherein the slip fit is an elastomeric cradle.

19. The apparatus of claim 15, further comprising a centrifugal pump configured to circulate preservation solution around the biological sample.

20. The apparatus of claim 15, wherein the pouch is configured to receive the biological sample.

* * * * *